United States Patent
Benisty et al.

(10) Patent No.: US 10,884,920 B2
(45) Date of Patent: Jan. 5, 2021

(54) METADATA-BASED OPERATIONS FOR USE WITH SOLID STATE DEVICES

(71) Applicant: Western Digital Technologies, Inc., San Jose, CA (US)

(72) Inventors: Shay Benisty, Beer Sheva (IL); Judah Gamliel Hahn, Ofra (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/417,617

(22) Filed: May 20, 2019

(65) Prior Publication Data

US 2020/0057715 A1 Feb. 20, 2020

Related U.S. Application Data

(60) Provisional application No. 62/718,913, filed on Aug. 14, 2018.

(51) Int. Cl.
*G06F 12/00* (2006.01)
*G06F 12/02* (2006.01)
(Continued)

(52) U.S. Cl.
CPC ...... *G06F 12/0246* (2013.01); *G06F 12/0862* (2013.01); *G06F 3/061* (2013.01);
(Continued)

(58) Field of Classification Search
CPC .... G06F 3/0653; G06F 3/0659; G06F 3/0616; G06F 3/0688; G06F 12/0246;
(Continued)

(56) References Cited

U.S. PATENT DOCUMENTS 5,890,211 A 3/1999 Sokolov et al.
6,092,154 A 7/2000 Curtis et al.
(Continued)

OTHER PUBLICATIONS

Hahn, et al., Office Action dated Dec. 14, 2017 for U.S. Appl. No. 15/050,364.

(Continued)

*Primary Examiner* — Kalpit Parikh
(74) *Attorney, Agent, or Firm* — Loza & Loza, LLP; Gabriel F. Fitch

(57) ABSTRACT

The disclosure relates in some aspects to the use of host metadata by a controller of a data storage device, such as the controller of a solid state device (SSD) having non-volatile memory (NVM) arrays that is coupled to a host device. In some aspects, the controller parses metadata within host commands to extract relevant hints and then correlates the hints with actual host device behavior. If the controller finds a strong correlation between the metadata hints and the host behavior, the hints are used for command storage optimization. Later, if there ceases to be a strong correlation between the hints and the host behavior, hint-based storage optimization may be suspended. In other aspects, the controller uses metadata to provide for virtual or expanded write streams. In still other aspects, the controller and the host device negotiate a structure for metadata during an initialization phase.

20 Claims, 21 Drawing Sheets

(51) Int. Cl.
*G06F 12/0862* (2016.01)
*G06F 3/06* (2006.01)
(52) U.S. Cl.
CPC .......... *G06F 3/0653* (2013.01); *G06F 3/0688* (2013.01); *G06F 2212/7207* (2013.01)
(58) Field of Classification Search
CPC ......... G06F 12/0862; G06F 2212/7207; G06F 2212/1016; G06F 2212/7206; G06F 2212/7203; G06F 2212/7205
See application file for complete search history.

(56) References Cited

U.S. PATENT DOCUMENTS

| | | | |
|---|---|---|---|
| 7,743,038 | B1 | 6/2010 | Goldick |
| 7,937,393 | B2 | 5/2011 | Prahlad et al. |
| 8,275,946 | B1 | 9/2012 | Smith |
| 8,775,741 | B1 | 7/2014 | De La Iglesia |
| 2003/0188184 | A1 | 10/2003 | Strongin et al. |
| 2006/0106984 | A1 | 5/2006 | Bartley et al. |
| 2006/0179236 | A1 | 8/2006 | Shafi |
| 2007/0266037 | A1 | 11/2007 | Terry et al. |
| 2008/0320211 | A1 | 12/2008 | Kinoshita |
| 2009/0031083 | A1 | 1/2009 | Willis et al. |
| 2009/0228875 | A1 | 9/2009 | Devries |
| 2010/0262721 | A1 | 10/2010 | Asnaashari et al. |
| 2011/0296088 | A1 | 12/2011 | Duzly et al. |
| 2011/0320685 | A1 | 12/2011 | Gorobets et al. |
| 2012/0051137 | A1 | 3/2012 | Hung et al. |
| 2012/0144092 | A1 | 6/2012 | Hsieh et al. |
| 2012/0284587 | A1 | 11/2012 | Yu et al. |
| 2012/0317335 | A1 | 12/2012 | Cho |
| 2013/0024609 | A1 | 1/2013 | Gorobets et al. |
| 2013/0080732 | A1 | 3/2013 | Nellans et al. |
| 2013/0086311 | A1 | 4/2013 | Huang et al. |
| 2013/0138867 | A1 | 5/2013 | Craft et al. |
| 2013/0191349 | A1 | 7/2013 | Akirav et al. |
| 2013/0262533 | A1* | 10/2013 | Mitra .................. G06F 12/0866 707/822 |
| 2013/0262736 | A1 | 10/2013 | Kegel et al. |
| 2013/0275672 | A1 | 10/2013 | Bert |
| 2013/0297852 | A1 | 11/2013 | Fai et al. |
| 2014/0082324 | A1 | 3/2014 | Elhamias et al. |
| 2014/0095790 | A1* | 4/2014 | Chambliss .......... G06F 12/0897 711/117 |
| 2014/0149641 | A1 | 5/2014 | Avila et al. |
| 2014/0289492 | A1 | 9/2014 | Ranjith Reddy et al. |
| 2014/0337560 | A1 | 11/2014 | Chun et al. |
| 2015/0199269 | A1 | 7/2015 | Bert et al. |
| 2015/0356020 | A1 | 12/2015 | Desai et al. |
| 2016/0026406 | A1 | 1/2016 | Hahn et al. |
| 2016/0054931 | A1 | 2/2016 | Romanovsky et al. |
| 2016/0054934 | A1 | 2/2016 | Hahn et al. |
| 2016/0246726 | A1 | 8/2016 | Hahn |

OTHER PUBLICATIONS

Romanovsky, et al., Office Action dated Aug. 9, 2017 for U.S. Appl. No. 14/555,548.
Hahn, Judah G. et al., Non-Final Office Action dated May 10, 2017 for U.S. Appl. No. 15/050,364.
Romanovsky, et al., Final Office Action dated Jan. 25, 2017 for U.S. Appl. No. 14/555,548.
Notice of Allowance and Fees Due for U.S. Appl. No. 14/297,563 (dated Jul. 25, 2016).
Non-Final Office Action for U.S. Appl. No. 14/555,548 (dated Jul. 5, 2016).
"NVM Express," Specification Revision 1.2.1, http://nvmexpress.org/wpcontent/uploads/NVM_Express_1_2_1_Gold_20160603.pdf, pp. 1-217 (Jun. 5, 2016).
Final Office Action for U.S. Appl. No. 14/297,563 (dated Apr. 13, 2016).
Non-Final Office Action for U.S. Appl. No. 14/814,460 (dated Mar. 28, 2016).
Prabhakaran et al., "Analysis and Evolution of Journaling File Systems," 2005 USENIX Annual Technical Conference, pp. 105-120 (2005).
Commonly-assigned, co-pending U.S. Appl. No. 14/977,559 for "Methods, Systems, and Computer Readable Media for Automatically and Selectively Enabling Burst Mode Operation in a Storage Device" (Unpublished, filed Dec. 21, 2015).
Non-Final Office Action for U.S. Appl. No. 14/297,563 (dated Dec. 4, 2015).
"NVM Express Overview," NVM Express, pp. 1-2 (copyright 2013).
"Understanding the Flash Translation Layer (FTL) Specification," AP-684 Application Note, Intel, pp. 1-20 (Dec. 1998).
"Ext4 Disk Layout," https://ext4.wiki.kernel.org/index.php/Ext4_Disk_Layout, Wikipedia, pp. 1-28 (Nov. 17, 2014).
"CreateFile function," Microsoft, Windows Dev Center, https://msdn.microsoft.com/enus/library/windows/desktop/aa363858(v=vs.85).aspx, pp. 1-20 (2008).
"NVM Express," Specification Revision 1.2, http://nvmexpress.org/wpcontent/uploads/NVM_Express_1_2_Gold_20141209.pdf, pp. 1-205 (Nov. 3, 2014).
"I/O Limits: block sizes, alignment and I/O hints," Red Hat, http://people.redhat.com/msnitzer/docs/io-limits.txt, pp. 1-4 (Jan. 14, 2013).
Commonly-assigned, co-pending U.S. Appl. No. 14/555,548 for "Storage Devices and Methods for Optimizing Use of Storage Devices Based on Storage Device Parsing of File System Metadata in Host Write Operations," (Unpublished, filed Nov. 26, 2014).
Hahn, et al., Office Action dated Aug. 25, 2017 for U.S. Appl. No. 14/464,584.
Non-Final Office Action for U.S. Appl. No. 14/464,584 (dated Nov. 18, 2016).
Notice of Allowance and Fees Due for U.S. Appl. No. 14/814,460 (dated Sep. 23, 2016).
Final Office Action for U.S. Appl. No. 14/464,584 (dated Apr. 26, 2016).
Non-Final Office Action for U.S. Appl. No. 14/464,584 (dated Dec. 4, 2015).
"NVM Express: Revision 1.3a," https://nvmexpress.org/wp-content/uploads/NVM-Express-1_3a-20171024_ratified.pdf (Oct. 24, 2017).
Trautman et al, "Scalability and Performance in Modern File Systems"; accessed Jun. 24, 2019; 10 pages; http://www.siliconbunny.com/downloads/xfs_white_paper.html.
Miller, Barton P., "CS 537 Notes, Section #26: Windows (NT) File System"; accessed Jun. 24, 2019; 5 pages; http://pages.cs.wisc.edu/~bart/537/lecturenotes/s26.html.

* cited by examiner

HOST BEHAVIOR / HINT CORRELATION TABLE 300

| Index | Hint Value from Metadata | Number of Occurrences of the Hint value | Expected Host Behavior | Number of Times of Expected Host Behavior | Lock Flag |
|---|---|---|---|---|---|
| #1 | | | | | |
| #2 | | | | | |
| #3 | | | | | |
| ... | | | | | |
| #n | | | | | |

HOT VS COLD ACCESS / HINT CORRELATION TABLE 400

| Index 404 | Hint Value from Metadata 406 | Number of Occurrences of the Hint value 408 | Number of Times of a Cold Access Occurs 412 | Lock Flag 414 |
|---|---|---|---|---|
| #1 | | | | |
| #2 $402_2$ | | | | |
| #3 $402_3$ | | | | |
| ... | | | | |
| #n $402_n$ | | | | |

*FIG. 4*

SEQUENTIAL VS NON-SEQUENTIAL ACCESS / HINT CORRELATION TABLE 500

| Index 504 | Hint Value from Metadata 506 | Number of Occurrences of the Hint value 508 | Number of Times of a Sequential Access Occurs 512 | Lock Flag 514 |
|---|---|---|---|---|
| #1 | | | | |
| #2 502₂ | | | | |
| #3 502₃ | | | | |
| ... | ... | ... | ... | ... |
| #n 502ₙ | | | | |

FIG. 5

METADATA-BASED OPERATIONS FOR USE WITH SOLID STATE DEVICES

CROSS-REFERENCE TO RELATED APPLICATION(S)

This application which claims priority to and the benefit of U.S. Provisional Application No. 62/718,913, filed on Aug. 14, 2018, and entitled, "METADATA-BASED OPERATIONS FOR USE WITH SOLID STATE DEVICES", the entire content of which is incorporated herein by reference.

FIELD

The disclosure relates, in some embodiments, to data storage devices and apparatus, such as solid state devices that employ controllers to access non-volatile memory arrays. More specifically, but not exclusively, the disclosure relates to the use of metadata by a controller of a data storage device or apparatus.

INTRODUCTION

Data storage devices and apparatus include solid state devices (referred to herein as SSDs) such as solid state drives. Such devices may incorporate non-volatile memory (NVM) arrays. Examples include NAND flash drives. Such devices are replacing or supplementing conventional rotating hard disk drives for mass storage in many consumer or industrial electronics and computers. In a typical SSD-based product, a host computing device includes or communicates with a controller of the SSD that in turn controls access to one or more NVM arrays (e.g. NAND arrays) of the SSD.

Many state-of-the-art SSD systems are designed in accordance with NVM express (NVMe) protocols. NVMe is a scalable host controller interface designed to address the needs of enterprise and client systems that utilize Peripheral Component Interconnect (PCI) Express-based SSDs. See, e.g., the NVM Express standard, Revision 1.3a, Oct. 24, 2017. With NVMe, a host device writes data storage device commands, such as read commands, write commands, and administrative commands, into submission queues that are implemented in host memory. The controller of an NVM storage device fetches the commands from the host submission queues, executes the commands, and posts entries in completion queues, which are also implemented in host memory, to thereby notify the host device of the completion of the commands.

Many such NVMe commands are data write commands that pertain to the storage of data within the NVM array of the SSD. In accordance with NVMe, metadata may be encoded within an input/output (I/O) command by the host device for storage along with other data within the NVM array. (Metadata is described in the NVMe specification as contextual information relevant to a particular logical block address (LBA) of data.) It would be desirable to configure a controller of an SSD to exploit NVMe metadata or other types of metadata to achieve various goals, such as the derivation of optimization hints for use by the SSD controller and/or to control the efficient handling of write streams.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage apparatus that includes an NVM array and a processor coupled to the NVM array. In one example, the processor is configured to: extract metadata from memory access commands received from a host device; derive a hint from the metadata; control NVM access operations based on the hint; determine a degree of correlation between the host device behavior and the hint; and adjust control of the NVM access operations based on the degree of correlation.

One embodiment of the disclosure provides a controller for use with an NVM array. In one example, the controller includes: a metadata extraction controller configured to extract metadata from commands received from the host device; a hint derivation controller configured to derive hint values from the metadata; a host behavior determination controller configured to determine host device behavior for the commands; a correlation controller configured to correlate the host device behavior with the hints derived from the metadata; and a hint reliability determination controller configured to determine whether the host device behavior remains consistent with the hints derived from the metadata.

One embodiment of the disclosure provides a method for use by a controller coupled to an NVM array. In one example, the method includes: extracting metadata from memory access commands received from a host device; deriving a hint from the metadata; controlling NVM access operations based on the hint; determining a degree of correlation between host device behavior and the hint; and adjusting control of the NVM access operations based on the degree of correlation.

One embodiment of the disclosure provides a data storage apparatus. In one example, the apparatus includes: means for extracting metadata from commands obtained from a host device; means for deriving hints from the metadata of the commands; means for tracking host device behavior associated with the commands; means for correlating the host device behavior with the hints; means for controlling memory access operations to a non-volatile memory (NVM) array based on the hints; means for determining whether the host device behavior remains consistent with the hints derived from the metadata; and means for suspending control of the memory access operations based on the hints if the host device behavior no longer remains correlated with the hints.

One embodiment of the disclosure provides a data storage apparatus that includes an NVM array and a processor coupled to the NVM array. In one example, the processor is configured to: receive a memory access command from a host device that includes a write stream field value, the memory access command also including metadata, determine if the write stream field value corresponds to a predetermined metadata write stream indicator and, if the write stream field value corresponds to the predetermined metadata write stream indicator, to extract the metadata from the memory access command, interpret at least a portion of the metadata as a write stream identifier, and process the command in accordance with the write stream identifier extracted from the metadata.

One embodiment of the disclosure provides a method for use by a controller coupled to an NVM array. In one example, the method includes: receiving a memory access command from a host device that includes a write stream field value, the memory access command also including metadata; and determining if the write stream field value corresponds to a predetermined metadata write stream indicator, and, if so, extracting the metadata from the memory access command, interpreting at least a portion of the metadata as a write stream identifier, and processing the command in accordance with the write stream identifier extracted from the metadata.

One embodiment of the disclosure provides a data storage apparatus. In one example, the apparatus includes: means for extracting metadata from commands obtained from a host device; means for deriving hints from the metadata of the commands; means for tracking host device behavior associated with the commands; means for correlating the host device behavior with the hints; means for controlling memory access operations to a non-volatile memory (NVM) array based on the hints; means for determining whether the host device behavior remains consistent with the hints derived from the metadata; and means for suspending control of the memory access operations based on the hints if the host device behavior no longer remains correlated with the hints.

One embodiment of the disclosure provides a data storage apparatus that includes an NVM array and a processor coupled to the NVM array. In one example, the processor is configured to: receive a memory access command from a host device that includes a write stream field value, the memory access command also including metadata, determine if the write stream field value corresponds to a predetermined metadata write stream indicator and, if the write stream field value corresponds to the predetermined metadata write stream indicator, to extract the metadata from the memory access command, interpret at least a portion of the metadata as a write stream identifier, and process the command in accordance with the write stream identifier extracted from the metadata.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIG. 3 illustrates a first example of a correlation table for use by an SSD controller for correlating metadata hints and host behavior.

FIG. 4 illustrates a second example of a correlation table for use by an SSD controller for correlating metadata hints and host behavior.

FIG. 5 illustrates a third example of a correlation table for use by an SSD controller for correlating metadata hints and host behavior.

DETAILED DESCRIPTION

Figure 1:
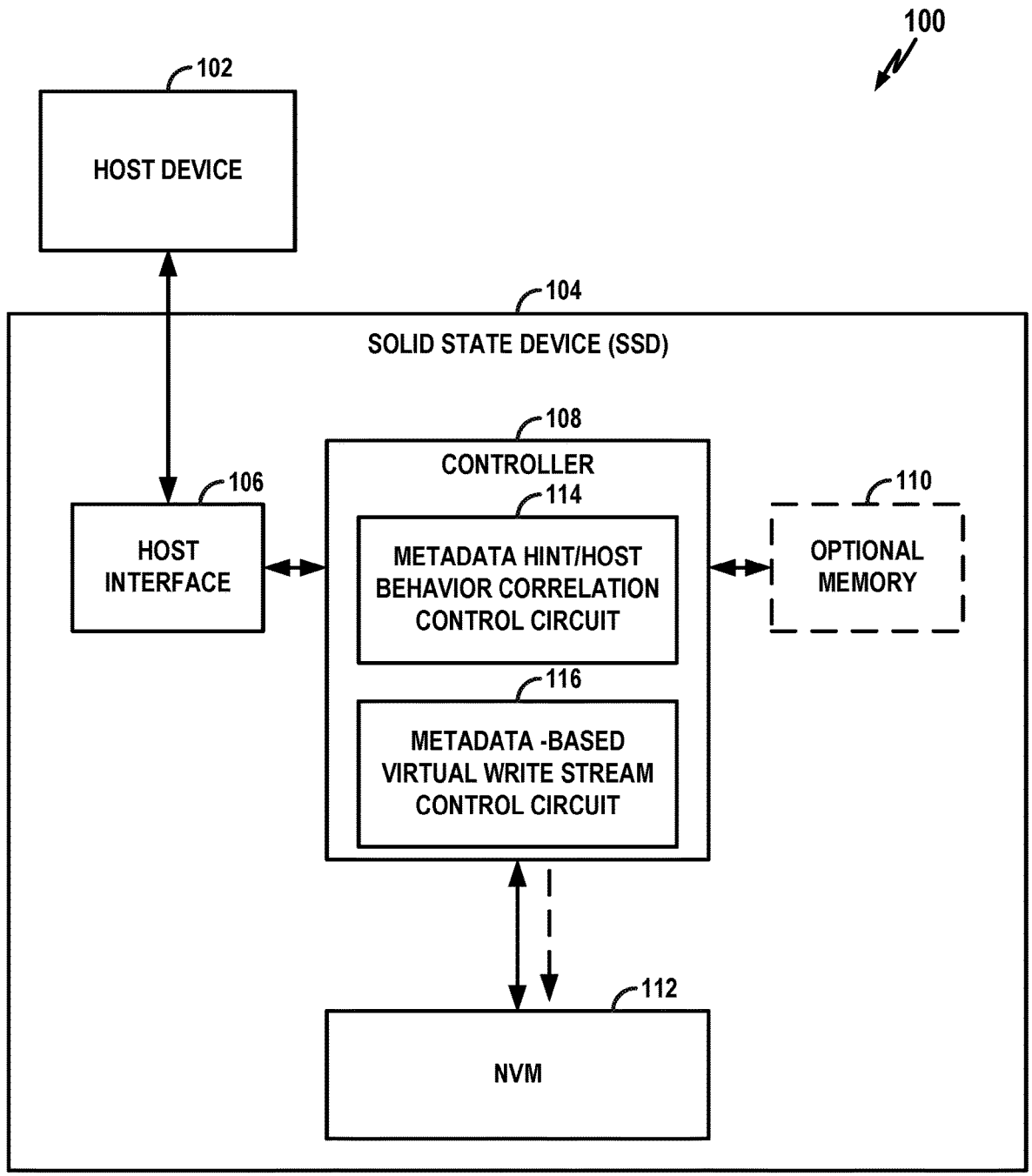
FIG. 1 illustrates an example of a memory system including a data storage device (e.g., an SSD) configured in accordance with one or more aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The main examples herein relate to data storage devices or data storage apparatus, where the device or apparatus may be a solid state device (SSD) such as a solid state drive. In many examples, the SSD includes a non-volatile memory (NVM) such as a NAND array.

When accessing NVM storage arrays, such as NAND arrays, it is desirable to use hints to optimize the utilization of the NAND arrays since there is a finite number of program and erase cycles before memory cells experience errors and become unusable. For example, it is desirable to use hints to store data that has the same anticipated host access pattern together in the NVM arrays. Accordingly, there is a need for components and methods for efficiently deriving hints from host commands for use in optimizing the utilization of the NAND arrays.

At least some features described herein relate to extracting flash management hints from NVM express (NVMe) host metadata or other types of metadata. That is, rather than having an SSD controller just transfer metadata from the host to an NVM array and vice versa, components and methods are described herein for configuring an SSD controller to extract metadata from the commands. It is noted that a metadata feature is defined in the NVMe standard (cited above) but the NVMe metadata feature is used for other purposes than providing hints. Some features described herein exploit NVMe metadata for passing hints directly from the host to the device controller for a better flash management. In one aspect, the host and the SSD controller agree during an initialization phase on the structure of the metadata so that the SSD controller can easily extract the metadata to then derive hints from the metadata. In other aspects, there is no agreement between the host and the SSD controller. Rather, the SSD controller parses metadata within host commands to extract relevant hints and then correlates the hints with actual host device behavior. If the SSD controller finds a strong correlation between the metadata hints and the host behavior, the hints are used for command storage optimization.

The disclosure thus relates in some aspects to various apparatus, systems, methods, and media for exploiting metadata provided within host commands sent by a host device to an SSD. For example, an SSD controller may be configured to: (a) derive hints from host command metadata and control NVM access operations based on the hints; (b) correlate the hints with subsequent host behavior; and (c) control NVM access operations based on the degree of correlation of the host behavior to a current set of hints by, for example, suspending the use of hints to control NVM access operations if host behavior is no longer well-correlated with the hints. As another example, an SSD controller may be configured to negotiate a metadata structure with a host device to facilitate extracting metadata and hints from host commands.

Some NVM command protocols, such as NVMe, provide for write streams. Briefly, write streams allow for a host to designate data of different commands as belonging to a common write stream so that the SSD controller can store similar data at contiguous locations within the NVM arrays. This may help reduce garbage collection efforts and reduce write amplification, so as to improve write performance, lower write latency, and increase device endurance (e.g. lifetime). However, for NVMe, and perhaps other standards, a maximum number of write streams is accommodated by the standard, which in practical systems may not be sufficient. In some particular examples, only sixteen write streams are permitted. Accordingly, there is a need for components and methods for efficiently increasing or expanding the number of write streams beyond what a particular standard might specify.

At least some features described herein relate to providing "virtual" or "expanded" write streams, which may be described as write streams beyond the maximum number of streams specified in or accommodated by a particular NVM command protocol specification or standard. In some examples described herein, the metadata field of a host I/O command is used to store a write stream identifier that is extracted by the SSD controller and employed to designate and track virtual/expanded write streams. In some examples, the host stores a particular value, referred to herein as a metadata write stream indicator, in a write stream ID field of an I/O command. The metadata write stream indicator is distinct from write stream IDs used by the standard. The metadata write stream indicator serves to notify the controller that the host is employing virtual/expanded write streams and that the virtual write stream ID for the command is encoded within the metadata field of the command In response, the controller extracts the write stream ID for the command from the metadata and uses the write stream ID to control the storage of the data for the command, such as by storing data in the NVM array at locations contiguous with other data from the same write stream. In this manner, a much larger number of write streams can be accommodated beyond those specified in an applicable NVM data transfer standard or specification.

The disclosure thus relates in some aspects to various apparatus, systems, methods, and media for exploiting metadata provided within host commands sent to an SSD to accommodate expanded write streams. For example, an SSD controller may be configured to: (a) receive a memory access command from a host device that includes a write stream field value, the memory access command also including metadata; and (b) determine if the write stream field value corresponds to a metadata write stream indicator, and, if so, (c) to extract the metadata from the memory access command, (d) interpret at least a portion of the metadata as a write stream identifier, and (e) process the command in accordance with the write stream identifier extracted from the metadata.

For the purposes of illustration, various aspects of the disclosure will be described in the context of a memory system that includes NAND memory technology. A NAND device may be referred to herein as a NAND Flash memory, a NAND memory device, a NAND flash, or a NAND. Generally speaking, a NAND device is an NVM having high storage density, fast access time, low power requirements in operation and advantageous shock resistance, compared to more conventional memory platforms. Raw NAND devices may be equipped (e.g., configured) with a serial interface such as Open NAND Flash Interface (ONFi), Common Flash Memory Interface (CFI), and the like. NAND devices may be configured as discrete memory chips or packaged with a controller to form a secure digital (SD) memory card, Multi Media Card (MMC), or a solid state disk. A NAND device may be configured with a single flash die, or a plurality of dies. In addition to memory cells, a NAND device may include other components, such as control/address logic components, I/O components, and data register components. It should be appreciated that the teachings herein are also applicable to other forms of memory (e.g., to NVMs other than NAND devices).

The systems and procedures described herein are particularly useful for use with SSD controllers equipped for use with NVMe specifications and protocols, but aspects of the embodiments described herein may be exploited in non-NVMe controllers as well.

Example Memory System

FIG. 1 illustrates an embodiment of a memory system 100 that includes a host device 102 and an SSD 104 communicatively coupled to the host device 102. The host device (e.g., a host computer) 102 provides commands to the SSD 104 for transferring data between the host device 102 and the SSD 104. For example, the host device 102 may provide a write command to the SSD 104 for writing data to the SSD 104 or a read command to the SSD 104 for reading data from the SSD 104. The host device 102 may be any system or device with a compatible interface for communicating with the SSD 104. For example, the host device 102 may a computing device, a personal computer, a portable computer, or workstation, a server, a personal digital assistant, a digital camera, a digital phone, or the like.

The SSD 104 includes a host interface 106, a controller 108, a volatile (optional) memory 110, and an NVM 112. The host interface 106 is coupled to the controller 108 and facilitates communication between the host device 102 and the controller 108. Additionally, the controller 108 is coupled to the volatile memory 110 and the NVM 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, peripheral component interface express (PCIe) interface, or the like. In many examples herein, the host interface 106 exploits PCIe-NVMe. In some embodiments, the host device 102 includes the SSD 104 (e.g., the host device 102 and the SSD 104 are implemented as a single component). In other embodiments, the SSD 104 is remote with respect to the host device 102 or is contained in a remote computing system coupled in communication with the host device 102. For example, the host device 102 may communicate with the SSD 104 through a wireless communication link. Note also that the controller 108 may be configured using any suitable technology and may be, for example, a physical hardware circuit or a logical controller formed of functional modules.

The controller 108 controls operation of the SSD 104. The controller 108 may receive commands from the host device 102 through the host interface 106 and perform the commands to transfer data between the host device 102 and the NVM 112. In addition, the controller 108 may perform internal operations such as garbage collection operations, data integrity operations, and wear leveling operations. The controller 108 may include any type of processing device, such as a microprocessor, a microcontroller, an embedded controller, a logic circuit, software, firmware, or the like, for controlling operation of the SSD 104.

In some embodiments, some or all of the functions described herein as being performed by the controller 108 may instead be performed by another element of the SSD 104. For example, the SSD 104 may include a separate microprocessor or other processing device for performing one or more of the functions described herein as being performed by the controller 108. In some embodiments, one or more of the functions described herein as being performed by the controller 108 are instead performed by the host device 102. In some embodiments, some or all of the functions described herein as being performed by the controller 108 may instead be performed by another element such as a controller in a hybrid drive including both non-volatile memory elements and magnetic storage elements.

The memory 110 may be any memory, computing device, or system capable of storing data. For example, the memory 110 may be a random-access memory (RAM) or other volatile memory, a dynamic RAM (DRAM), a static RAM (SRAM), a synchronous DRAM (SDRAM), a flash storage, an erasable programmable read-only-memory (EPROM), an electrically erasable programmable ROM (EEPROM), or the like. In various embodiments, the controller 108 uses the memory 110, or a portion thereof, to store data during the transfer of data between the host device 102 and the NVM 112. For example, the memory 110 or a portion of the memory 110 may be a cache memory.

The controller 108 includes a metadata hint/host behavior correlation control circuitry circuit 114 configured, e.g., for (a) deriving hints from host command metadata and controlling NVM access operations based on the hints; (b) correlating the hints with subsequent host behavior; and (c) controlling NVM access operations based on the degree of correlation of the host behavior to a current set of hints. The controller 108 also includes a metadata-based virtual write stream control circuit 116 configured, e.g., for controlling the generation (creation) and use of virtual write streams. Although not explicitly shown in FIG. 1, the controller 108 may additionally or alternatively be equipped to negotiate a metadata structure with a host device during initialization to facilitate extracting metadata and hints from host commands. This features is illustrated in other figures, discussed below.

Figure 2:
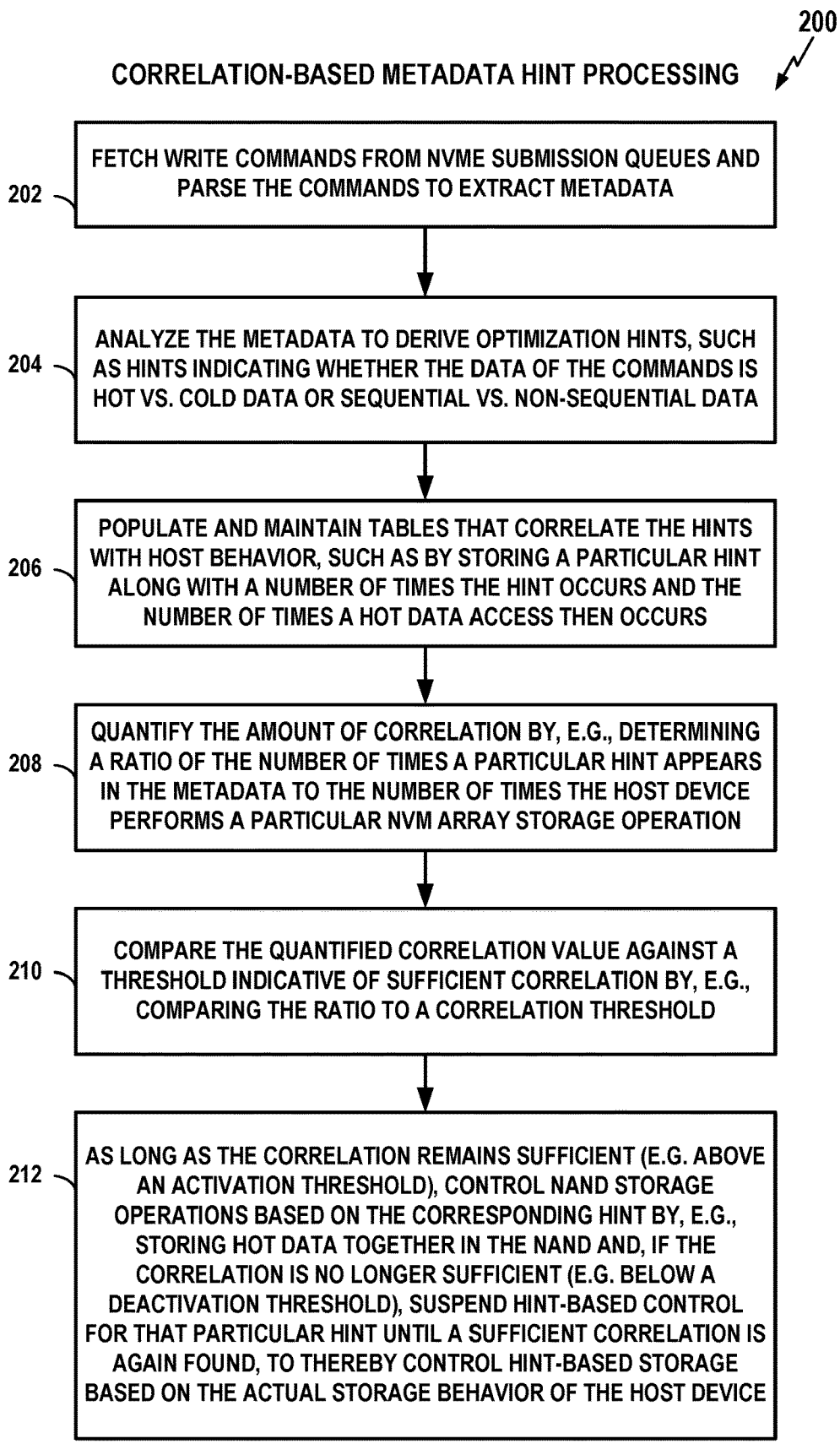
FIG. 2 illustrates an example of operations for use by an SSD controller for controlling data storage based on a correlation between metadata hints and host behavior.

Exemplary Metadata Hint/Host Behavior Correlation Control Systems and Operations FIG. 2 illustrates an embodiment of operations 200 that may be performed in conjunction with correlating hints and host behavior in accordance with the teachings herein. Hints, as the term is used herein, refer to common attributes among at least two access (e.g., read or write) commands provided to the SSD. Hints may include, e.g., access attributes, logical-to-physical address translation attributes, and error correction attributes. The operations 200 may take place within an SSD or other suitable device or apparatus. For example, one or more of the operations may be performed by the controller 108 (e.g., the correlation control circuit 114) of FIG. 1. At block 202, the controller fetches write commands from NVMe submission queues and parses the commands to extract (e.g. read out) metadata. The commands may specify the storage of data at a particular logical block address (LBA). At block 204, the controller analyzes the metadata to derive optimization hints, such as hints indicating whether the write data of the commands is hot vs. cold data, or sequential vs. non-sequential data.

As understood by those skilled in the NVM art, "hot" data is a term of art that refers to data which is written or updated (requiring write access) often or frequently, such a directory or logging information. "Cold" data is all other data, i.e., data not often or frequently written or updated, such as program code, image files, etc. Cold data might be written once or infrequently but read frequently. Thus, it is the frequency of write access that distinguishes hot data from cold data. In some examples, a threshold may be defined to distinguish hot data from cold data where the threshold specifies a particular write frequency (or similar value). If data is written with a higher frequency than the threshold frequency, the data is considered to be hot data and any write access involving that data is deemed to be a hot data access. If data is not written with a higher frequency than the threshold frequency, the data is considered to be cold data and any write access involving that data is a cold access. The particular threshold may vary from one SSD to another and may be set by engineers designing the SSD and programmed into the SSD. The threshold for distinguishing hot data from cold data should not be confused with the correlation threshold discussed below, which distinguishes strong correlation from weak correlation.

At block 206, the controller populates and maintains tables that correlate the hints with host behavior, such as by, e.g., storing a particular hint value along with a number of times the hints occurs and the number of times a hot data access then occurs. Exemplary tables are discussed below. At block 208, the controller quantifies the amount of correlation by, e.g., determining a ratio of the number of times a particular hint appears in the metadata to the number of times the host device performs a particular NVM array storage operation. For example, if a particular hint value appears one hundred times in the metadata for write commands and, each time the hint appears, the corresponding write data is hot data, then the ratio is 1.0. If the particular hint value appears one hundred times but, each time the hint appears, half of the corresponding writes are cold data, the ratio is only 0.5. At block 210, the controller compares the quantified correlation value against a threshold indicative of sufficient correlation by, e.g., comparing the ratio to a correlation threshold of, e.g., 0.75.

At block 212, as long as the correlation remains sufficient (e.g. above the threshold), the controller controls NAND storage operations based on the corresponding hint by, e.g., storing hot data together in the NAND with other hot data and, if the correlation is no longer sufficient, the controller suspends hint-based control for that particular hint until a sufficient correlation is again found, to thereby control or adjust hint-based storage based on the actual storage behavior of the host device. For example, if the correlation ratio for a particular hint remains above 0.75, the controller optimizes NAND storage for commands that include that particular hint (by, for example, storing hot data together with other hot data or storing sequential data along with other sequential data). If the correlation ratio falls below 0.75, the controller thereby determines that host behavior is no longer sufficiently well correlated with the hint and suspends further optimization based on that particular hint. In this manner, hint-based storage of data in the NVM is controlled based on the actual storage behavior of the host device (e.g. sequential vs. non-sequential storage of data, etc.)

FIG. 3 illustrates an exemplary host behavior/hint correlation table 300, which may be used for correlating host behavior with hints derived from metadata. In some examples, to correlate host behavior with hints, the controller implements one or more statistical tables that maintain statistics for each of a set of selected hint scenarios, such as cold access hints, hot access hints, sequential access hints, etc. Exemplary tables for particular hint scenarios are discussed below. FIG. 3 illustrates a generalized table.

Table 300 includes a set of entries 302, each of which has an index value 304, which may be a numerical pointer value the controller uses to track and manage the various entries. In FIG. 3, different entries 302 in the table are shown with subscripts (e.g. $302_2$, $302_3$ and $302_n$) to indicate the different rows within the table. Each entry 302 stores a particular hint value 306 extracted from the metadata of host commands. In some examples, the controller is configured based on the assumption that the host works in byte granularity and so the metadata structure is likewise in byte granularity (as it is highly unlikely that the host has the needed hints encoded in one bit, such as cold/hot bit). In an NVMe example, metadata size is eight bytes and the controller derives candidate hints from the following locations within the field (in the following order): (a) hint size is eight bytes; (b) hint size is four bytes (two options); (c) hint size is two bytes (four options); and (d) hint size is one byte (eight options). And so one exemplary hint value is a particular (specific) eight-byte sequence within the entire eight-byte metadata field. Another exemplary candidate hint value is a different (specific) eight-byte sequence within the entire eight-byte metadata field. Yet another exemplary candidate hint value is a particular (specific) four-byte sequence in the first half of the eight-byte metadata field. As can be appreciated, even with these assumptions, there can be a large number of possible (e.g. candidate) hint values and, at least initially, the controller typically will not know which of the possible hint values are useful as actual hints. Accordingly, initially, the controller extracts values from various fields within the metadata and populates the table 300 with those values. In some examples, only host commands that specifically relate to I/O access to the NVM are processed to extract metadata and derive hints from the metadata, such as host write commands and host read commands.

Each entry 302 also tracks the number of occurrences 308 of the particular corresponding hint value 306 within incoming host commands, i.e. the number of times that particular hint value appears in the commands. This may be implemented by using a counter to count each such occurrence and then increment the corresponding value 308. Each entry 302 also stores an expected (or predicted) host behavior 310, such as cold access, hot access, sequential access, etc., and tracks the number of times the particular expected host behavior 312 occurs for commands that have the corresponding hint value 306. For example, a particular entry $302_2$ in the table may track the number of cold accesses that occur whenever a write command is received that has the particular hint value 306. Another particular entry $302_3$ in the table may track the number of cold accesses that occur whenever a write command is received that has a different particular hint value 306. Again, a counter may be used to count the occurrences. As data is collected, the controller assesses, for each entry in the table 300, the amount of correlation between the particular hint value 306 for the entry and the expected host behavior 312 by comparing the number of occurrences 308 of the (candidate) hint with the number of times the expected (predicted) host behavior 312 occurs.

As noted above, the amount of correlation may be quantified by calculating the ratio of the number of occurrences of the hint to the number of times the expected behavior. The closer the ratio is to 1.0, the stronger the positive correlation. A threshold may be set, such as 0.75, to indicate whether the correlation is strong enough to warrant using the particular candidate hint to optimize controller operations. Although not shown, the current value of the ratio may be stored in the table 300 as well. In some examples, the ratio is compared to the threshold only after a sufficient number of occurrences of a particular hint value have been recorded, such as at least one hundred.

The table 300 also includes, for each entry 302, a lock flag 314 for indicating whether an adequate level of correlation has been found between a particular candidate hint value and a particular host behavior. The lock value 312 is set ON if the hint has been determined to be a reliable hint (because there is a strong correlation between the hint and the expected host behavior). Once the lock is set ON for a particular entry 302 in the table 300, the hint 306 of that entry is used by the controller to help optimize its operations based on the expected host behavior 310, by for example, storing cold data with cold data, and hot data with hot data. The controller may periodically assess whether the strong correlation remains (i.e. whether the host continues to behave as expected) and, if not, the lock value 312 is reset to OFF to indicate that the particular hint is no longer considered a reliable hint for predicting host actions and, in that case, further optimization based on that particular hint is suspended. At any given time, some hints may be deemed to be sufficiently well-correlated with host behavior to warrant optimization, whereas other hints may be disregarded.

Note that a different threshold may be set to suspend hint-based optimization than used to activate hint-based optimization. In one example, a lock flag threshold is set to, e.g. 0.8, to trigger activation of hint-based optimization; whereas an unlock flag threshold is set to, e.g., 0.6 to suspend or deactivate hint-based optimization. Still further, note that a ratio of 0.0 may be used to indicate a negative correlation, which also may be useful for controlling hint-based optimization. For example, if a particular hint value is always associated with the host not performing some action (such as not performing a cold access), then a ratio of 0.0 will be detected, and the hint value can be used to control NVM operations based on the strong negative correlation (which may instead indicate hot access). Thus, both positive and negative correlation may be tracked and exploited. In some examples, a ratio of 0.5 indicates a lack of either positive or negative correlation. Hence, in some examples, separate thresholds may be set for positive vs. negative correlation. In one such example, a negative correlation threshold of 0.2 may be set so that, if the ratio falls below that value, a strong negative correlation is noted. The corresponding positive correlation threshold may be, as noted, 0.8.

During an initialization period, the controller may collect data from numerous host commands to populate the table 300 with a wide variety of possible candidate hint values and a wide variety of possible host behaviors that might be correlated with those hints. In practice, a majority of the possible hint values initially stored in the table might not be correlated with any sort of host behavior, and so many of the table entries will show no correlation between a particular hint and any host behavior. Such entries may be deleted from the table to save space. In many cases, only a few of the entries will show a strong correlation between a hint and a corresponding host behavior and so, as a practical matter, such entries may be saved whereas other entries are discarded. The size of the table may be specified in terms of the total number of entries and, when the table becomes full, entries that show poor correlation are deleted first. In other examples, when the table becomes full, a new entry from a newly received command replaces the oldest entry in the table by exploiting a Least Recently Used (LRU) algorithm or the like. Before removing an entry from the table, the controller may seek to optimize the table by merging several entries with the same attributes and creating entries with a group of hints. This is discussed below.

Generally speaking, the more entries in the table, the better the resolution and accuracy, but larger tables may consume more area in the device and may consume more processing time, and hence contribute to greater latency. Also, note that separate tables may be used for different expected host behaviors. In the examples below, two separate tables are maintained, a hot vs. cold access table, and a sequential vs. non-sequential access table.

FIG. 4 illustrates a hot vs cold access/hint correlation table 400. As with table 300 of FIG. 3, table 400 has a set of entries 402 each including an index value 404. Different entries 402 are again shown with subscripts (e.g. $402_2$, $402_3$ and $402_n$). Each entry 402 again stores a particular candidate hint value 406 extracted from the metadata of host commands Each entry 402 also tracks the number of occurrences 408 of the particular corresponding hint value 406 within incoming host commands In table 400, a column is not used for storing the expected (or predicted) host behavior, since the table is specifically used for tracking hot vs. cold access. Column 412 tracks the number of times a cold access occurs for commands that have the corresponding hint value 406. As data is collected, the controller assesses, for each entry in the table 400, the amount of correlation between the particular hint value 406 and cold access by comparing the number of occurrences 408 of the hint with the number of times a cold access occurs. The correlation is quantified by calculating the ratio of the number of occurrences of the hint to the number of correspond cold access. The closer the ratio is to 1.0, the stronger the correlation between the hint and cold access. The closer the ratio is to 0.0, the stronger the correlation between the hint and hot access. A ratio of close to 0.5 indicates little or no correlation (and hence the corresponding hint is not useful for optimization). In one example, a ratio of greater than 0.8 indicates a strong correlation between the hint and cold accesses, and the controller then uses the hint to optimize storage operations accordingly. For example, the next time the same hint is found in another host command, the controller then assumes that the data of the command is cold data and treats the data accordingly. In some examples, the ratio is compared to one or more thresholds only after a sufficient number of occurrences of a particular hint value have been recorded, such as at least one hundred.

As with table 300, table 400 also includes, for each entry 402, a lock flag 414 for indicating whether an adequate level of correlation has been found between a particular hint value and either hot or cold access. In the example of FIG. 4, the lock flag may be set ON if the ratio is either close to 1.0 (e.g. >0.8) or close to 0.0 (e.g. <0.2), indicating, respectively, a strong cold access correlation or a strong hot access correlation. The controller may periodically assess whether a strong correlation remains and, if not, the lock value 414 is set to OFF to indicate that the particular hint is no longer considered a reliable hint for predicting hot vs. cold accesses and further optimization based on that particular hint is then suspended. As already noted, at any given time, some hints may be sufficiently well-correlated with host behavior to warrant hint-based optimization, whereas other hints may be disregarded.

FIG. 5 illustrates a sequential vs non-sequential access/hint correlation table 500. As with the tables discussed above, table 500 has a set of entries 502 each including an index value 504. Different entries 502 are again shown with subscripts (e.g. $502_2$, $502_3$ and $502_n$). Each entry 502 again stores a particular candidate hint value 506 extracted from the metadata of host commands Each entry 502 also tracks the number of occurrences 508 of the particular corresponding hint value 506 within incoming host commands Column 512 tracks the number of times a sequential access occurs for commands that have the corresponding hint value 506. As data is collected, the controller assesses, for each entry in the table 500, the amount of correlation between the particular hint value 506 for the entry and sequential access by comparing the number of occurrences 508 of the hint with the number of times a sequential access occurs. The correlation is quantified by calculating the ratio of the number of hint occurrences to the number of sequential accesses. The closer the ratio is to 1.0, the stronger the correlation between the hint and sequential access. The closer the ratio is to 0.0, the stronger the correlation between the hint and non-sequential access. A ratio of close to 0.5 again indicates little or no correlation. As with tables 300 and 400, table 500 includes, for each entry 502, a lock flag 514 that indicates whether an adequate level of correlation has been found between a particular hint value and either sequential or non-sequential access.

Figure 6:
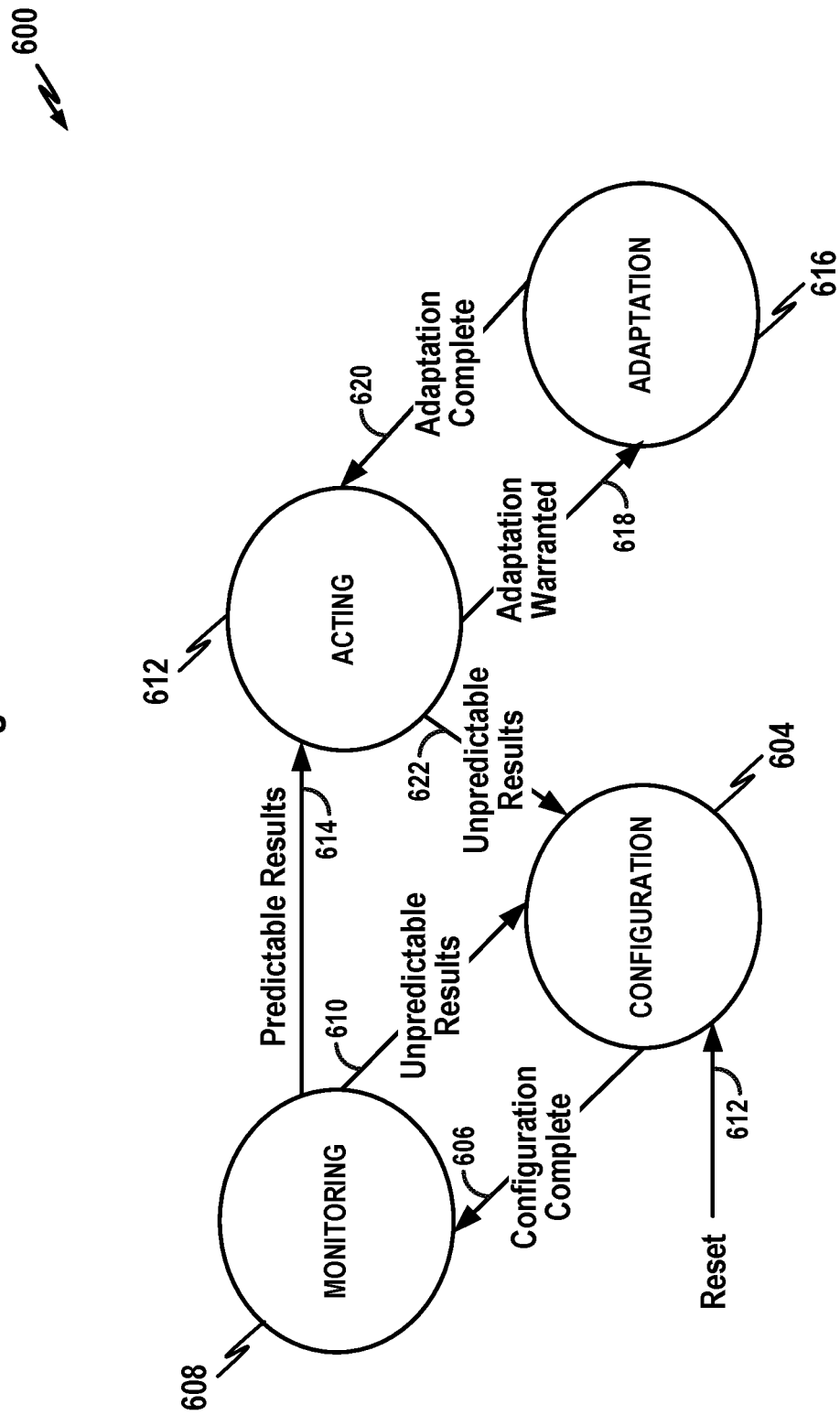
FIG. 6 illustrates an example of a state machine for use by an SSD controller for controlling data storage based on a correlation between metadata hints and host behavior.

FIG. 6 illustrates a state machine 600 that may be exploited to manage the aforementioned tables and collect statistics to populate the tables. Depending upon the implementation, the state machine may be embodied in hardware, software, firmware or some combination thereof. In some examples, each state of the state machine 600 corresponds to a procedure that performs the functions of the state or to a hardware device that embodies or implements the functions. A separate state machine may be implemented or configured for each separate table. That is, one such state machine may be used to manage a hot vs cold access table, and another may be used to manage sequential vs. non-sequential access table. In discussing FIG. 6, a hot access vs cold access table is used as an example.

Following a reset 612, a configuration state or procedure 604 is activated during which the controller configures the mode of operation for the table. For instance, the particular expected location of hint fields is configured (such as by using the procedure discussed above where an initial eight-byte hint field is initially assumed). During configuration state 604, the maximum size of the table may be set, and the various thresholds may be set, based on device programming or using default values.

Once an initial configuration procedure is complete, as indicated by arrow 606, the state machine transitions the controller to a monitoring state 608 to operate in a monitor mode. In the monitor mode, the controller collects statistics from incoming host commands by (as discussed above), extracts potential (candidate) hint values from the command metadata, stores the values in the table, and increments counters indicating how many times the same hints appear and how many times a cold access then occurs in the execution of the corresponding command. Monitoring proceeds until a sufficient amount of information is obtained, such as at least one hundred counts of a particular hint value, or at least one thousand storage access commands have been processed.

If, after the sufficient amount of information has been obtained and stored in the table, the results are unpredictable (i.e. no strong correlation is found between the hints and either hot or cold accesses), the controller returns to the configuration state 604 (via transition 610) to reconfigure the table by, e.g., reconfiguring the expected location of hint fields from an initial eight-byte hint value to a four-byte hint value in the first half of the metadata field. That is, the controller tries to find better or more effective hints. Processing again returns to the monitoring state 608. If the controller now obtains predictable results, e.g. lock flags in the table are set, the controller transitions to the acting state 612 (as indicated by arrow 614). In the acting state 612, the controller acts or operates according to the hints for which the lock flags have been set by performing hint-based optimization (such as by storing cold data together with other cold data), while continuing to collect information from new commands.

While in acting state 612, based on newly acquired information, the controller may detect that some minor adaptation may be made to the table to, for example, merge redundant entries. For instance, the controller may detect that it is tracking two separate hint entries that always appear together and so those entries may be combined into one. (In one specific example, one entry may correspond to the first four bytes of an eight-byte metadata field, while the other entry corresponds to the second four bytes of the eight-byte metadata field, and so the hint can more efficiently be saved and tracked as a single eight byte hint.) Another example of adaptation is that if one or more hints are no longer effective (e.g. no longer strongly correlated with host behavior) but other hints remain effective, the controller may adapt the procedure by ignoring hints that are not effective and deleting those entries.

If adaptation is warranted, the controller transitions to an adaptation state 616 (as shown by arrow 618) where the adaptation is performed (by merging table entries, separating table entries, etc., as appropriate) and returns to the acting state 612 (as indicated by arrow 620). If, at some point, the results are no longer predictable (i.e. there is no longer a strong correlation between the hints and the host behavior because, e.g., the host has changed its behavior), the controller returns to configuration state 604 (as indicated by arrow 622) to remove (all or some) of the lock flags and reconfigure the table (by, e.g., again changing the hint values in search of better values). In some embodiments, the table is saved in the NVM during a power cycle or a change in power state of the controller, so the table need not be recreated once the controller is again running.

Figure 7:
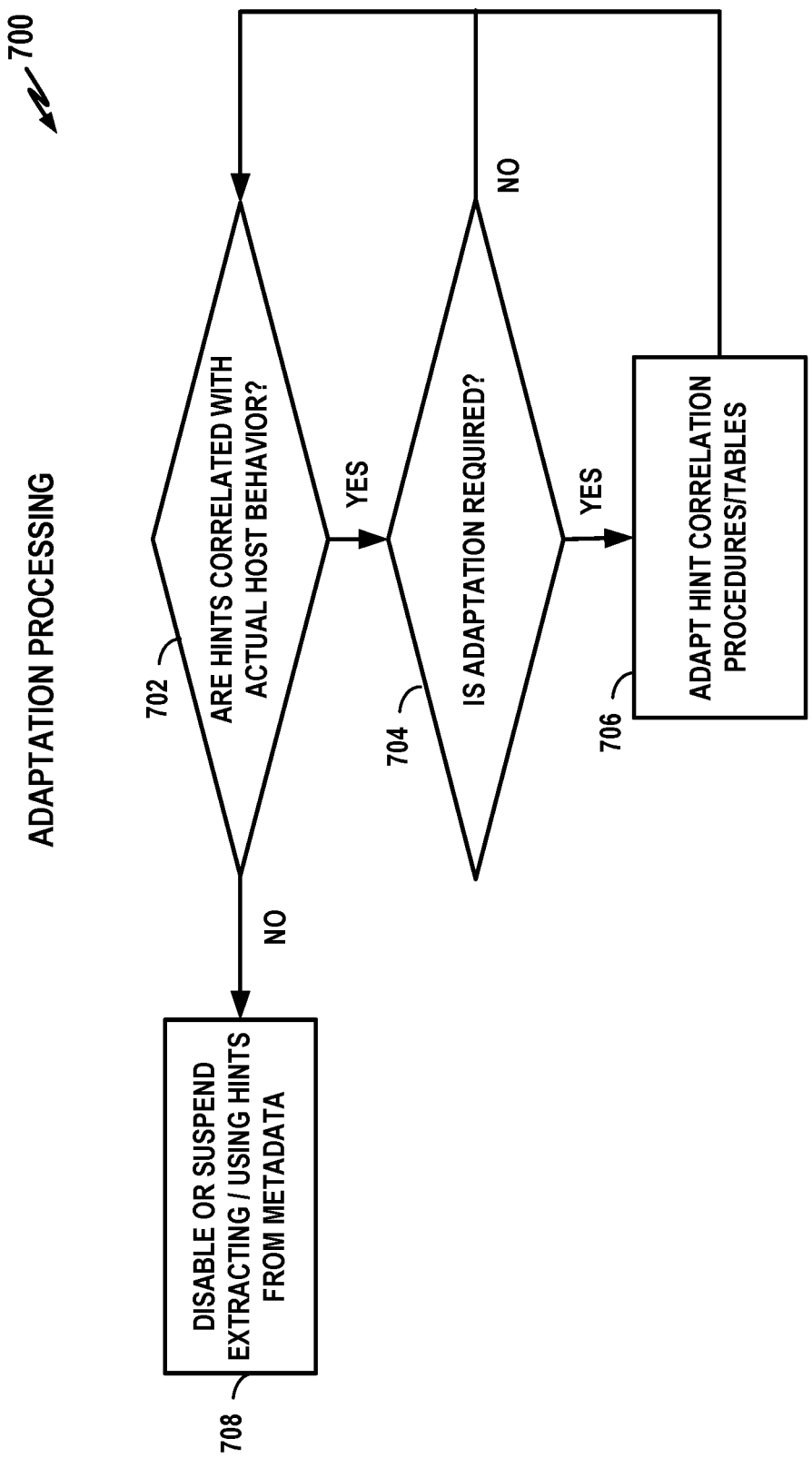
FIG. 7 illustrates an example of operations for use by an SSD controller for controlling adaptation processing.

FIG. 7 summarizes the adaptive behavior of the system by way of an embodiment 700. At decision block 702, a controller (or other suitable apparatus) determines whether or not hints are correlated with actual host behavior. If correlated, then at decision block 704, the controller determines whether any adaptation of the correlation tables is required (such as the sort of adaptation discussed above in the adaptation state 616 of the state machine 600 of FIG. 6). If so, then at block 706, the controller adapts its hint correlation procedures/tables by, for example, combining entries in the correlation tables, etc.). If, at some point, hints are no longer correlated with actual host behavior at block 702, then, at block 708, the extraction and use of hints from metadata is disabled or suspended. Although not shown in FIG. 7, hint processing may be reactivated later, perhaps after a pre-defined period of time or using some other criteria such as a pre-defined number of new commands have been processed. Note that FIG. 7 summarizes certain adaptation aspects of the overall procedure and does not illustrate all aspects of a practical procedure, such as the various operations of FIG. 2, described above.

Insofar as the structuring of metadata within a command is concerned, the hint extraction and correlation procedures described herein do not require any particular structure. It suffices that the controller can be configured to know where the metadata is within a command (so metadata may be distinguished from actual data). Nevertheless, as a practical matter, extraction of metadata is facilitated based on knowledge of the structure of metadata within a particular command protocol. For NVMe, the NVM Express standard, Revision 1.3a, Oct. 24, 2017, describes the handling of metadata in Sections 8.2 and 8.3 and elsewhere in the document. Briefly, with NVMe, metadata is additional data allocated on a per logical block basis. There is no requirement for how the host makes use of the metadata area. One of the most common usages is to convey end-to-end protection information.

Figure 8:
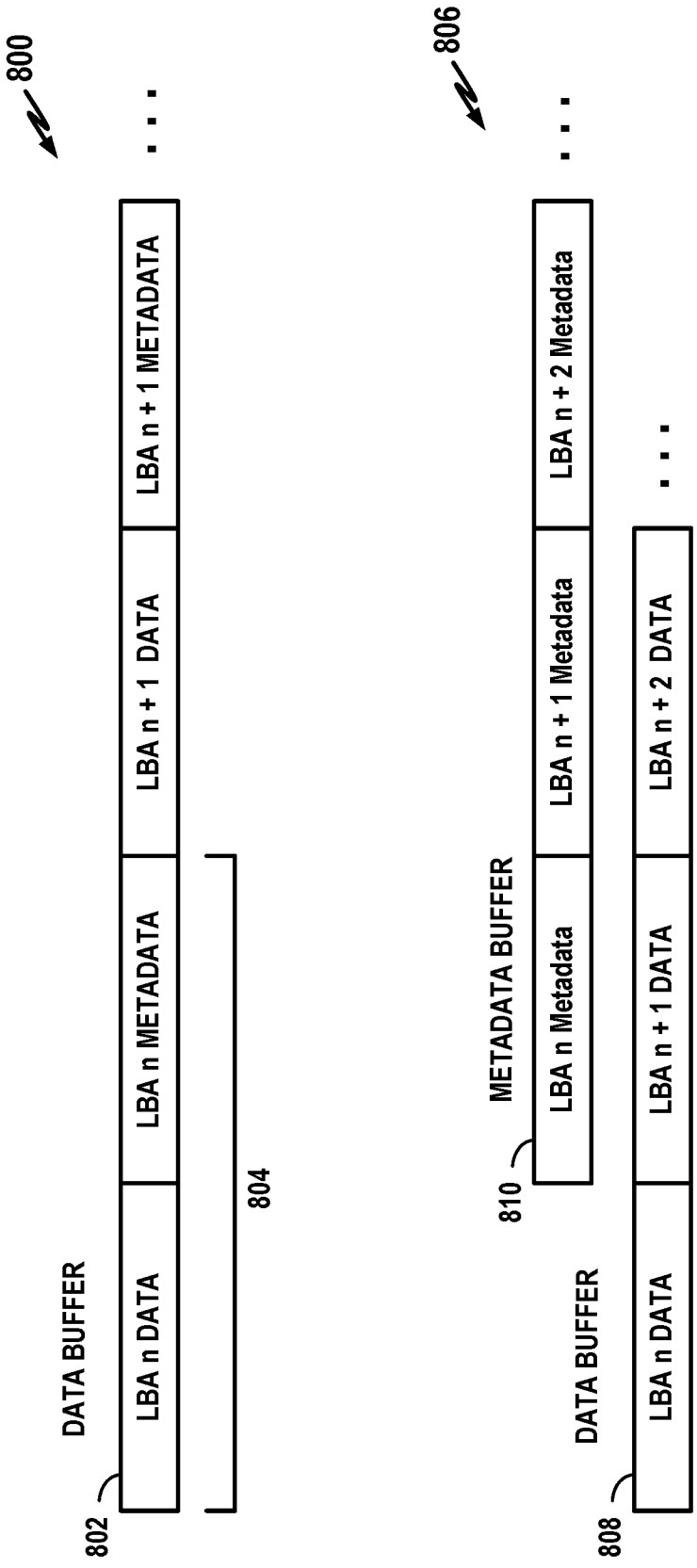
FIG. 8 illustrates an example of a metadata buffer from which metadata may be extracted by an SSD controller.

As shown in FIG. 8, and according to NVMe, Rev. 1.3a, metadata may be transferred by the controller to/from the host in one of two ways. The particular mechanism or procedure to be used is selected by the host when a namespace is formatted. The first mechanism or procedure 800 for transferring metadata is as a contiguous part of the logical block it is associated with within a data buffer 802. The metadata associated with a logical block is transferred at the end of the block, forming an extended logical block 804. As shown, a block of data in data buffer 802 (e.g. LBA n data) is followed by a corresponding block of metadata (LBA n metadata) as an extended block 804, then a next block of data (e.g. LBA n+1 data) is followed by its corresponding block of metadata (LBA n+1 metadata).

The second mechanism or procedure 806 for transferring the metadata is to use a data buffer 808 and a separate metadata buffer 810. As shown, a block of data within the data buffer 808 (e.g. LBA n data) is followed by the next block of data (e.g. LBA n+1 data) in the data buffer 808. Concurrently, a block of metadata in the separate metadata buffer 810 (LBA n metadata) is followed by a next block of metadata (LBA n+1 metadata) in the metadata buffer 810. If end-to-end data protection is used, then the Protection Information field for each logical block is contained in the metadata. If this optional mechanism is enabled, then additional protection information (e.g. CRC) is added to the logical block that may be evaluated by the controller and/or host software to determine the integrity of the logical block. This additional protection information, if present, is either the first eight bytes of metadata or the last eight bytes of metadata, based on the format of the namespace.

Thus, based on the namespace selected by the host for NVMe, the controller configures its NVMe metadata extraction components to extract metadata from the appropriate location (either from the NVMe data buffer or from the separate NVMe metadata buffer). As already explained, the particular structure of hints within the metadata need not be specified by the host to the controller, which instead parses the metadata fields to extract hints, as already described. For other protocols besides NVMe, other metadata storage specifications and procedures may be provided by the Standard with metadata stored differently. Generally speaking, for any particular NVM data transfer protocol defined by a Specification or Standard, the designers of an SSD controller (configured to operate with the particular Standard) may program or configure the controller to extract metadata from the particular metadata fields or locations as specified by the particular Standard or Specification. Again, so long as metadata can be distinguished from other data fields, the metadata can be extracted by the controller and analyzed to extract any hints that might be provided therein.

Exemplary Controller/Host Metadata Hint Negotiation Systems and Operations

In some examples, rather than configuring the controller to derive hints from metadata via correlation-based procedures without any initial knowledge of the structure of hints in the command metadata, the host and the controller may instead negotiate upon SSD initialization to specify the location of hints in the metadata so the controller may then extract and use those hints without performing correlation-based procedures.

Figure 9:
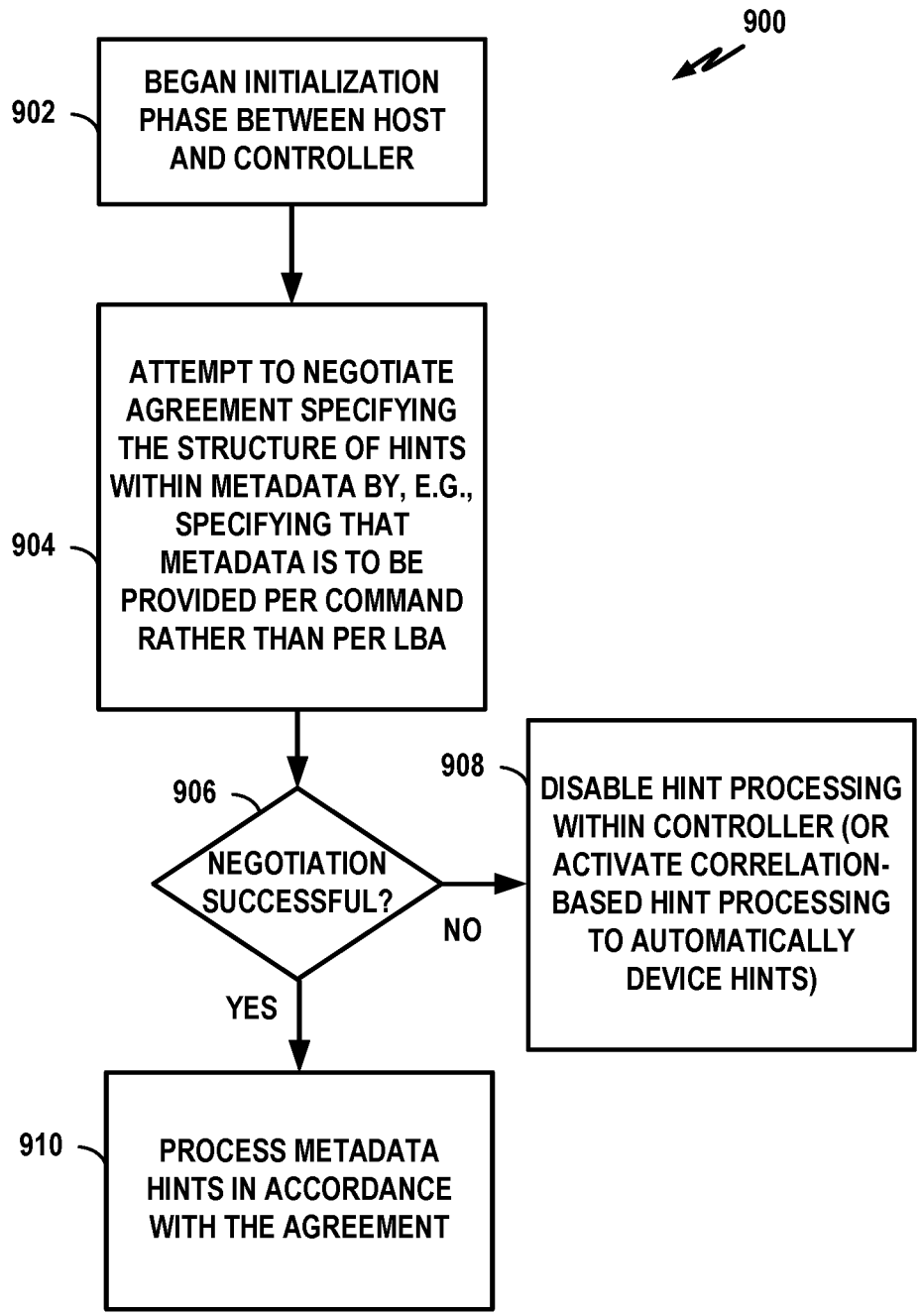
FIG. 9 illustrates an example of operations for use by an SSD controller for negotiating a metadata hint structure with a host device.

FIG. 9 summarizes exemplary negotiation procedures by way of an embodiment 900. At decision block 902, an initialization procedure or phase is begun by an SSD controller and the host device. At block 904, the controller and the host attempt to negotiate a particular structure for metadata hints. In one example, the host may specify the particular structure for metadata hints that the host is programmed to use and the controllers configures its components accordingly and issues an acknowledgement back to the host. In another example, the controller may specify the particular structure for metadata hints that the controller is programmed to receive and the host configures its components accordingly and issues an acknowledgement back to the controller. In an NVMe example, where the metadata block is ordinarily provided per LBA, the host and the controller may agree to instead provide metadata per command rather than per LBA, as indicated in block 904. In this embodiment, the hints stored in the metadata may be used for the entire host command and not just for a specific LBA indicated in the command.

If no agreement is reached (perhaps because the host is not equipped to perform the negotiation), as determined at decision block 906, then, as indicated by block 908, hint-based operations by the controller are not activated (or the above-described correlation-based procedures are activated instead). If an agreement is reached, then at block 910, the host and the controller work to process metadata hints based on the negotiated agreement. Note that for read command execution, the host may decide not to activate the metadata feature, so the device controller will then not need to provide those hints back to the host.

Figure 10:
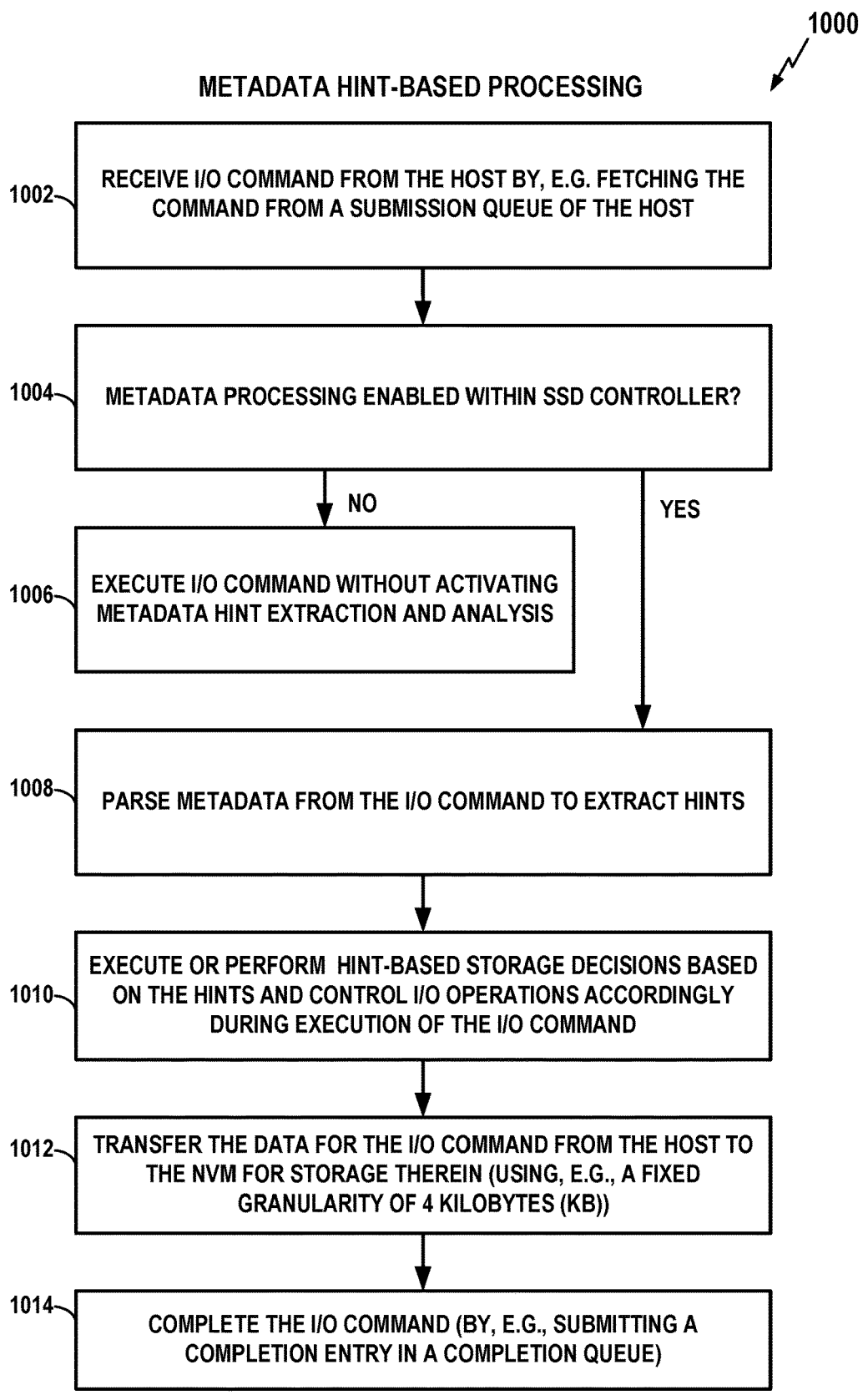
FIG. 10 illustrates an example of operations for use by an SSD controller for controlling hint-based processing.

FIG. 10 summarizes procedures by way of an embodiment 1000 that may be used once initialization has been completed (successfully). The operations 1000 may take place within an SSD or other suitable apparatus. At block 1002, an SSD controller receives an I/O command from a host device (by, e.g. fetching the command from a submission queue of the host using NVMe procedures). At block 1004, the controller determines or detects whether or not metadata processing is currently enabled within its memory controller components. As already explained, if negotiation is successful during the initialization phase, then metadata processing will be enabled within the controller. If metadata processing is not currently enabled, then, at block 1006, the controller executes the I/O command without activating metadata hint extraction and analysis.

However, if metadata processing is currently enabled, then, at block 1008, the controller parses metadata from the I/O command based on the negotiated hint structure to extract hints. At block 1010, the controller executes, makes or performs intelligent hint-based storage decisions based on the hints and controls I/O operations accordingly during execution of the I/O command (such as, e.g., by deciding to store cold data with cold data and hot data with hot data, etc.). At block 1012, the controller transfers the data for the I/O command from the host to the NVM (again assuming the I/O command is a write command) or performs other appropriate I/O operations. In some examples, metadata is transferred first and then the data itself is transferred. Such processing may be especially appropriate if a separate buffer is used for the metadata. In other embodiments, metadata is transferred as part of the data (as with the example described above where metadata is provided within the data buffer). In another embodiment, the controller operates using a fixed granularity, e.g. 4 kilobyte (KB). In this mode, metadata and data are interleaved while transferring both with a 4 KB granularity (i.e. data of 1st 4 KB, metadata of 1st 4 KB, data of 2nd 4 KB, metadata of 2nd 4 KB, etc.) At block 1014, the controller completes the I/O command (by, e.g., submitting a completion entry to a completion queue of the host using NVMe procedures).

As noted, in some examples, if an initial negotiation with the host is unsuccessful, the controller may activate correlation-based procedures for deriving hints. If so, then at block 1002, even if negotiation was unsuccessful, the controller may proceed by assuming that hints are nevertheless available somewhere within the metadata of the I/O commands and the controller then attempts to derive the metadata hints at block 1008. That is, in some examples, metadata processing is initially enabled within the controller even if negotiation is unsuccessful. If no correlation between host behavior and metadata hints is then found, hint processing may be suspended or deactivated.

Exemplary Virtual Write Stream Systems and Operations

As noted above, some NVM command protocols, such as NVMe, provide for write streams so the that, for example, the SSD controller can store the data from the same write stream at contiguous locations within the NVM arrays to reduce garbage collection, improve write performance, and increase device endurance, etc. At least some of the exemplary embodiments described herein use metadata to provide for virtual (or expanded or extended) write streams to extend the number of streams beyond those of the specification.

Figure 11:
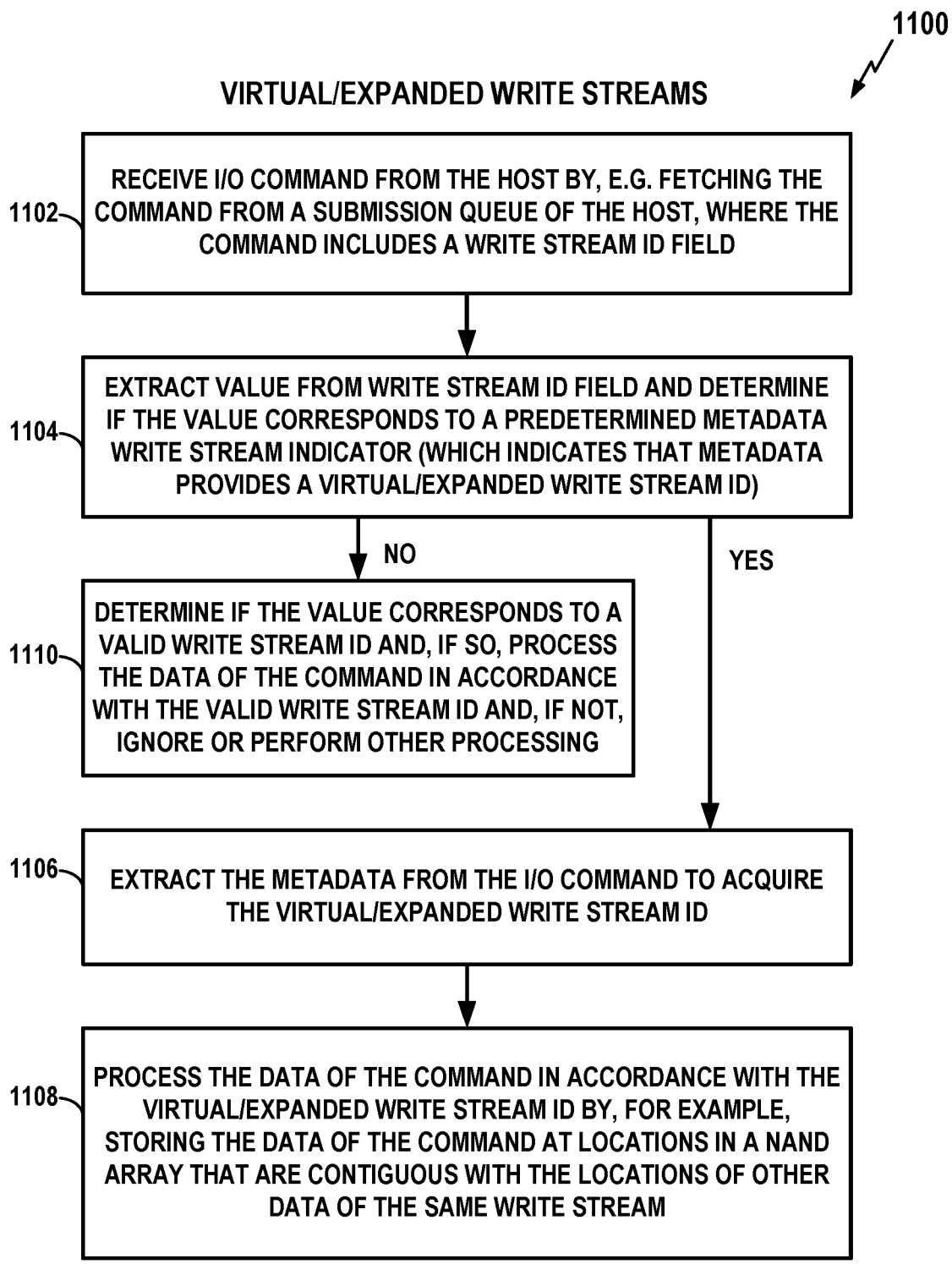
FIG. 11 illustrates an example of operations for use by an SSD controller for creating and controlling virtual/expanded write streams.

FIG. 11 summarizes procedures by way of an embodiment 1100 that may be used to enable virtual/expanded stream streams. The operations 1100 may take place within an SSD or other suitable apparatus. At block 1102, the controller receives an I/O command from the host by, e.g. fetching the command from a submission queue of the host, where the command includes a write stream ID field. At block 1104, the controller extracts or reads out the value from the write stream ID field and determines if the value corresponds to a predetermined metadata write stream indicator (which indicates that metadata for the command provides a virtual/expanded write stream ID). The metadata write stream indicator might also be referred to as a "virtual write stream indicator," an "expanded write stream indicator," or by using other suitable terms. An exemplary metadata write stream indicator value may be a particular hexadecimal value that the host and the controller have agreed to use as the indicator. In one particular example, the hexadecimal indicator may be "Fh." Hence, in some examples, during an initialization phase, the controller notifies the host that it is equipped to process virtual write streams, and, if the host is likewise equipped, the host notifies the controller of the particular indicator value it will store in I/O commands to indicate that the metadata for those commands contain virtual write stream IDs.

If the value read out of the write stream ID field corresponds to the predetermined metadata write stream indicator, i.e. a virtual write stream is enabled for the particular command, then, at block 1106, the controller extracts the metadata from the I/O command to acquire the virtual/ expanded write stream ID. At block 1108, the controller processes the data of the command in accordance with the virtual/expanded write stream ID acquired from the metadata by, for example, storing the data of the command at locations in a NAND array that are contiguous with the locations of other data of the same write stream. If, at block 1104, the controller determines that the value read from the write stream ID field does not correspond to the predetermined metadata write stream indicator, i.e. this particular command does not correspond to a virtual write stream, then, at block 1110, the controller does not seek to acquire a virtual write stream ID from the metadata. In some examples, the controller at block 1110 may be configured to determine if the value corresponds to a valid write stream ID (i.e. valid ID specified by, or permitted by, the applicable standard) and, if so, the controller processes the data of the command in accordance with the valid write stream ID and, if not, the controller may ignore the value or perform other suitable processing. In this manner, if a particular standard specifies certain write stream IDs to be used for its standard write streams, those standard write streams may be accommodated by having the host encode the standard predetermined write stream ID in the write stream ID field of the command, which the SSD controller then uses as the write stream ID for that command. That is, both standard write stream IDs and virtual/expanded write stream IDs may be accommodated.

Figure 12:
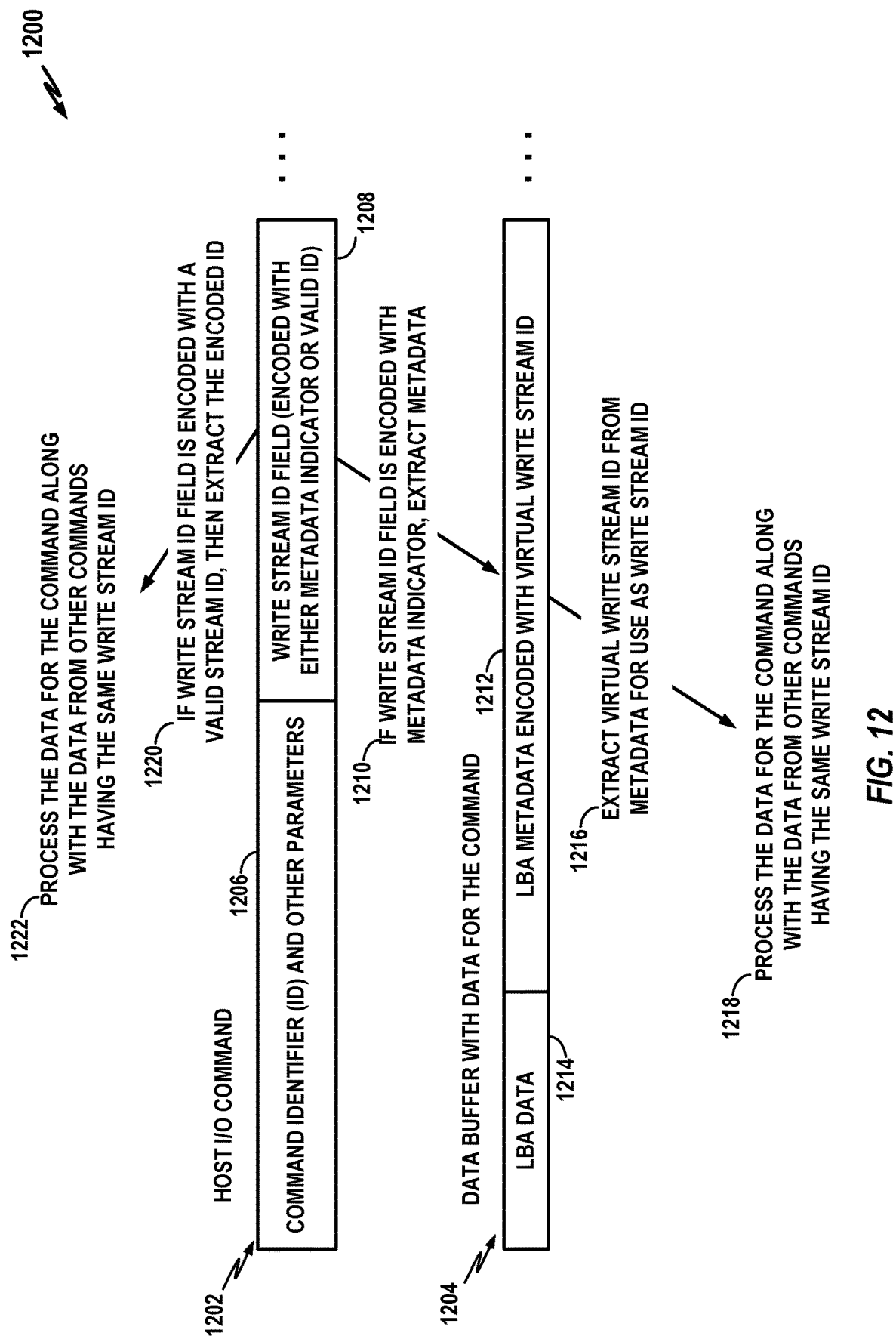
FIG. 12 illustrates an example of a host I/O command from which a write stream metadata indicator may be extracted by an SSD controller.

FIG. 12 summarizes aspects of a virtual write stream embodiment 1200 by illustrating an exemplary host I/O command 1202 and a data buffer 1204 corresponding to the command. The I/O command 1202 includes a portion 1206 (which provides a command ID and other parameters) and a write stream ID field 1208 (which is encode with either the predetermined metadata write stream indicator or a valid stand write stream ID). If, as indicated by reference numeral 1210, the write stream ID field 1208 is encoded with the predetermined metadata write stream indicator, the controller extracts metadata from the metadata portion 1212 of the data buffer 1204, which encodes the virtual write stream ID. (As shown, the data buffer 1204 also includes one or more LBA data fields 1214, as discussed above.) As indicated by reference numeral 1216, the controller then extracts the virtual write stream ID from the metadata for use as a write stream ID and, at 1218, the controller processes the data for the command (or just the data for the LBA) along with the data from other commands (or just the data for other similar LBAs) that have the same write stream ID to, for example, store such data together in a NAND array.

Conversely, if, as indicated by reference numeral 1220, the write stream ID field 1208 is encoded with a valid write stream ID (rather than the predetermined metadata write stream indicator), the controller extracts the write stream ID from the write stream ID field 1208. As indicated by reference numeral 1222, the controller then processes the data for the command (or just the data for a particular LBA) along with the data from other commands (or just the data for other particular LBAs) that have the same write stream ID to, for example, store such data together in a NAND array. If the write stream ID field does not include either the predetermined metadata write stream indicator or a valid stream ID, the value may be ignored or other processing may be performed in accordance with the applicable standard.

Figure 13:
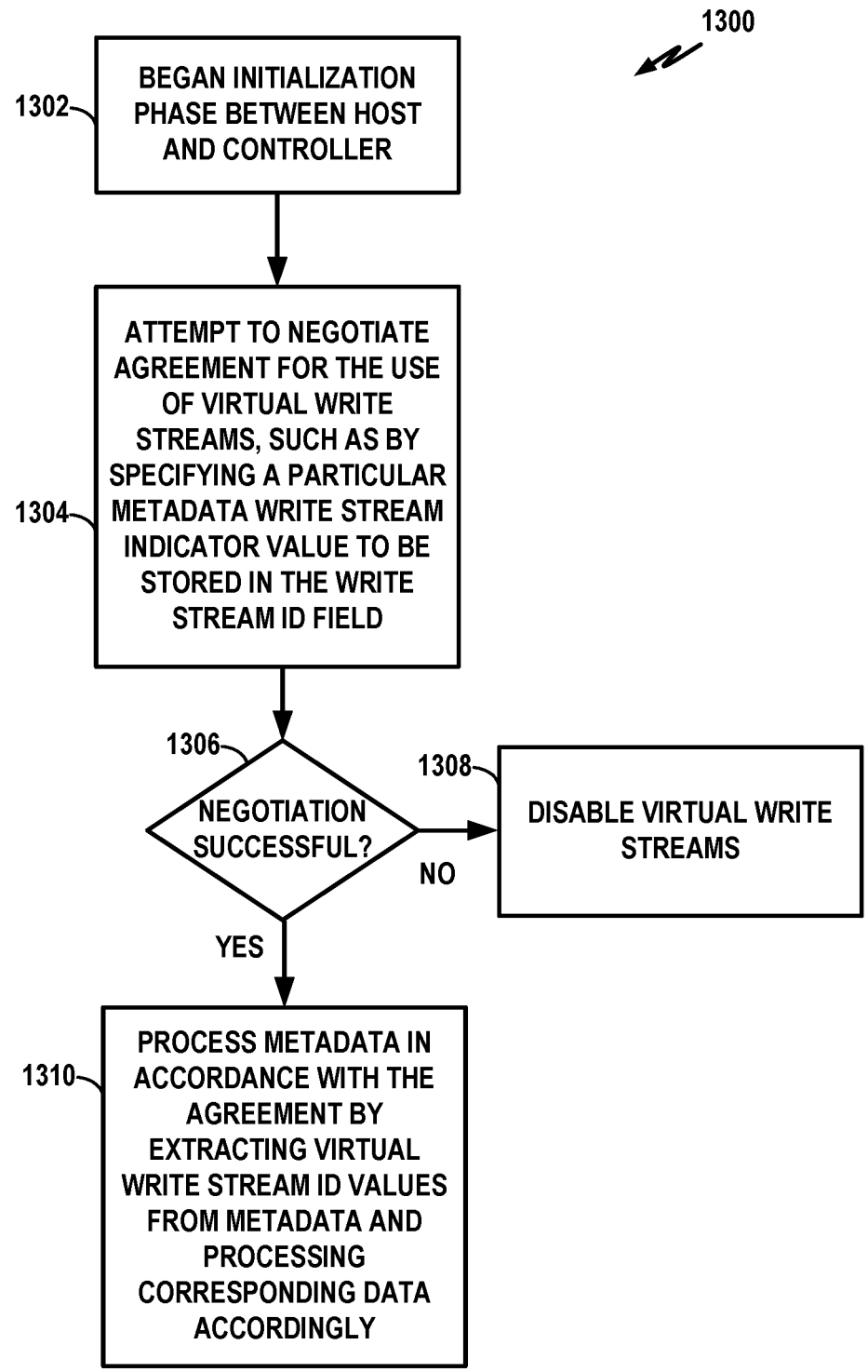
FIG. 13 illustrates an example of operations for use by an SSD controller for negotiating an agreement for using virtual/expanded write streams with a host device.

As noted, in some examples, the host and the controller negotiate upon initialization to specify the use of virtual write streams. FIG. 13 summarizes exemplary negotiation procedures that may be used by way of an embodiment 1300. At decision block 1302, an initialization procedure or phase is begun by an SSD controller and the host device. At block 1304, the controller and the host attempt to negotiate an agreement for the use of virtual write streams, such as by specifying a particular metadata write stream indicator value to be stored in the write stream ID field. If no agreement is reached (perhaps because the host is not equipped to implement virtual write streams), as determined at decision block 1306, then, as indicated by block 1308, virtual write streams are disabled or otherwise not activated. If an agreement is reached, then at block 1310, the host and the controller work to process metadata in accordance with the negotiated agreement by extracting virtual write stream ID values from metadata and processing corresponding data accordingly.

Exemplary NVMe Embodiments

Figure 14:
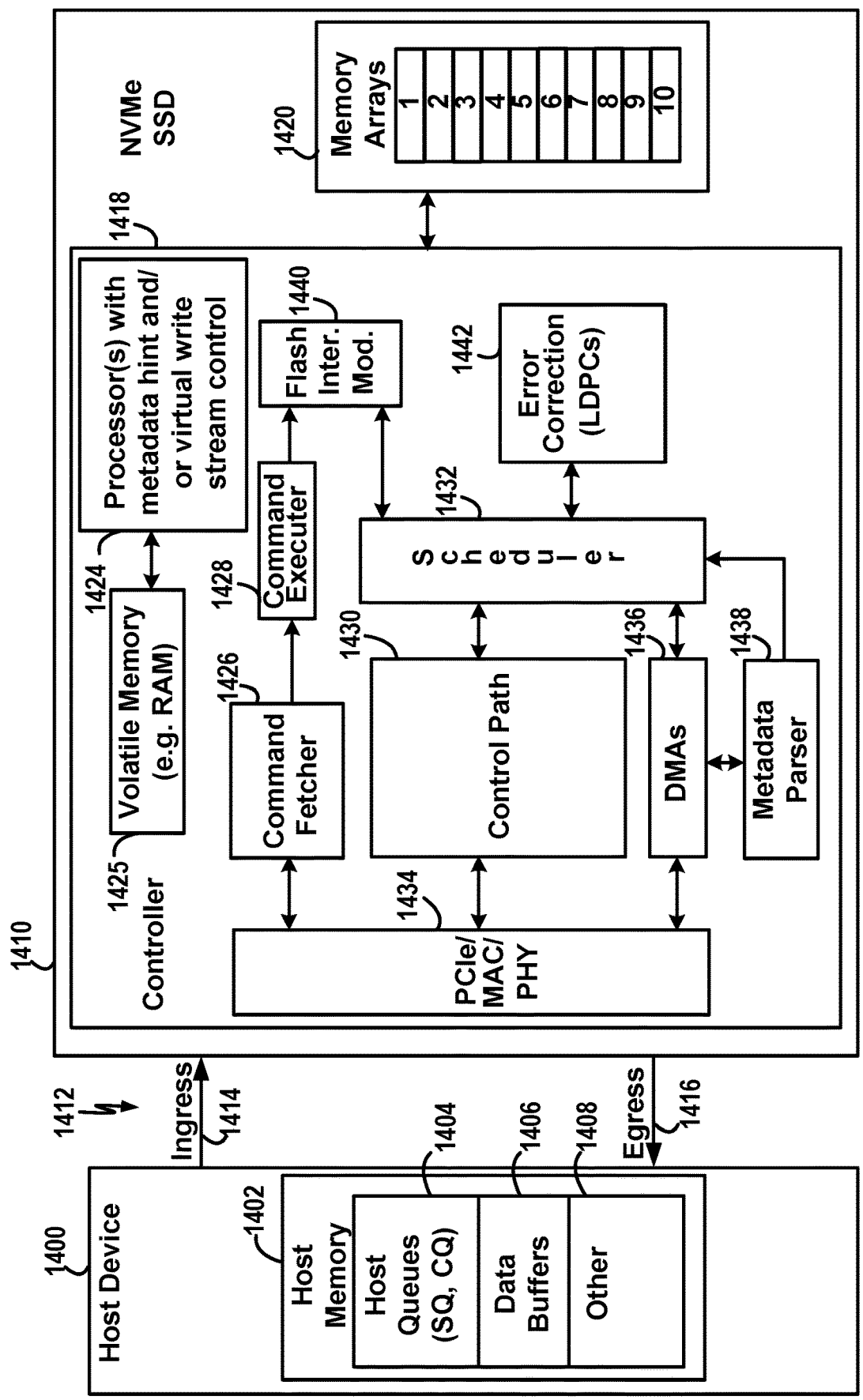
FIG. 14 illustrates a data storage system equipped for use with NVM Express (NVMe), where the controller includes a processor that processes metadata.

FIG. 14 illustrates certain features of an exemplary NVMe architecture in which the above-described metadata parsing systems and procedures may be implemented. In FIG. 14, a host device 1400 may be any suitable computing or processing platform capable of accessing memory on an NVM data storage device using NVMe procedures. For example, host device 1400 may be a desktop personal computer, a laptop computer, a tablet computer, a mobile telephone, or a front end to a storage array. The host memory 1402 may be configured to include, as shown, various host submission queues (SQs) and completion queues (CQs) 1404, data buffers 1406 and other memory components 1408. The host device 1400 may store data in an NVMe storage device 1410. The NVMe SSD 1410 may be any suitable device that provides NVM storage for host device 1400 in accordance with NVMe standards. For example, the SSD 1410 may be a removable storage SSD, such as a flash drive that is removably connectable to host device 1400. In another example, the SSD 1410 may be non-removable or integrated within the host device 1400. In some embodiments, the host device 1400 and the NVMe SSD 1410 are communicatively connected via a PCIe bus 1412 (including ingress 1414 and egress 1416).

The SSD 1410 of FIG. 14 includes an NVMe controller 1418 and an NVM array 1420 such as a NAND. The controller 1418 controls access to the NVM array 1420. The controller 1418 thus may be an SSD controller that implements or supports the NVMe protocol, and the NVM 1420 may be 2D or 3D NAND flash memory. One are more processor(s) 1424 are provided to control operations, including the above-described metadata hint control functions (e.g. the use of hints to intelligently control storage operations) and the above-described virtual write stream control functions. An internal volatile memory (e.g. a RAM) 1425 is shown that may be used as a volatile memory to store the various correlation tables discussed above. Additionally, or alternatively, other memory components may be provided, such as DRAMs that are external to the controller but internal to the device 1410. In some examples, the processor(s) 1424 may be configured to implement the state machine described above. In some examples, the processor(s) 1424 are configured to perform initialization phase negotiation (if so configured) and/or to perform the virtual write stream processing (if so configured). The processor(s) 1424 are also responsible for the execution of Frond-End (FE) and Back-End (BE) tasks.

In use, a command fetcher 1426 of the NVMe controller 1418 fetches commands from the submission queues within the host memory 1402 and forwards the commands to a command executer 1428. The command fetcher 1426 is responsible for fetching and parsing the commands from the host and queuing them internally and may form part of a FE/host interface module (HIM) of the NVMe controller 1418. The command executer 1428 is responsible for the arbitrating and executing the commands Upon completion of the commands, the controller 1418 generates completion entries that are ultimately directed to the completion queues within the host memory 1402. A control path 1430 is responsible for transferring control information between host and device, including managing the host completion queues. Among other functions, the control path 1430 routes completion entries received from a scheduler 1432 to a completion queue within the host device 1400 via a PCIe/MAC/PHY interface 1434. Note that the operation of the scheduler might be adjusted, in some examples, to exploit the hints.

Actual pages of data to be delivered to the host device 1400 (such as the result of read commands applied to the memory arrays 1420) are delivered along with metadata to the host device 1400 using one or more DMAs 1436. A metadata parser 1438 is responsible for parsing host metadata and extracting the required hints. As already explained, depending upon the particular embodiment, the metadata may be interleaved within data buffers along with data or may be provided in a separate metadata buffer. Although not specifically shown in FIG. 14, the parser 1438 and the processor(s) 1424 may be interconnected via various internal signal and communication lines so that metadata extracted by the parser 1438 may be relayed to the processor(s) for processing and analysis.

Additional components of the NVMe controller 1418 shown in FIG. 14 include a flash interface module (FIM) 1440, which is responsible for controlling and accessing the memory arrays 1420, and an error correction module 1442, which is responsible for error correction and may include various low-density parity-check (LDPC) engines.

In the following, various general exemplary procedures and systems are described.

First Example Process or Procedure

Figure 15:
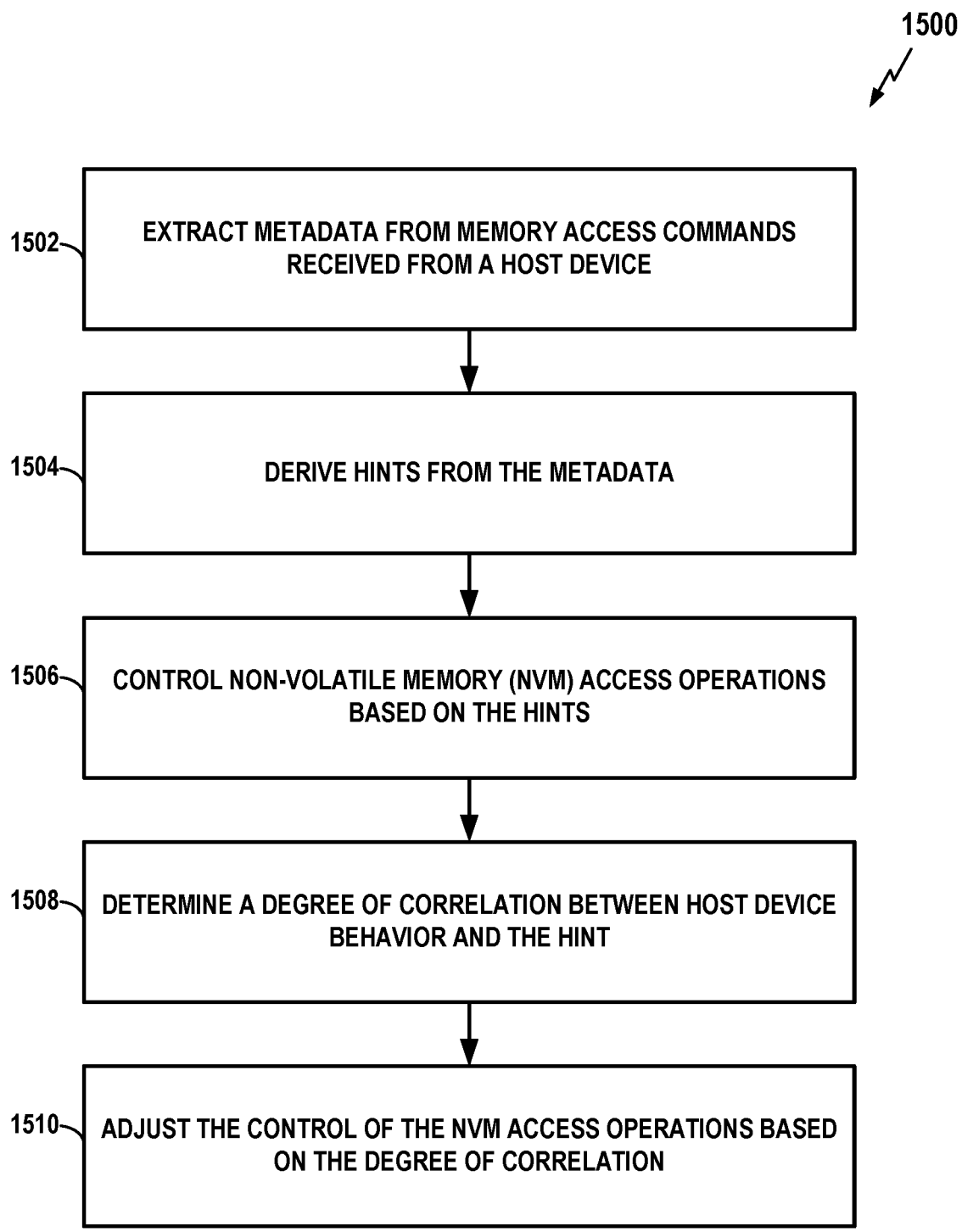
FIG. 15 illustrates a first example of a process for use by an SSD controller for adjusting the control of the NVM access operations based on a degree of correlation between hints and host behavior.

FIG. 15 illustrates a process 1500 in accordance with some aspects of the disclosure. The process 1500 may take place within an apparatus such as a processor or processing circuit (e.g., the processor(s) 1424 of FIG. 14), which may be located in an SSD controller or other suitable apparatus. However, in various aspects within the scope of the disclosure, the process 1500 may be implemented by any suitable apparatus or device capable of performing the operations. At block 1502, an apparatus (e.g., a controller of an SSD) extracts metadata from memory access commands received from a host device. In some aspects, extraction of the metadata is performed by fetching write commands from NVMe submission queues and parsing the commands to extract metadata, as described above. At block 1504, the apparatus derives hints from the metadata. In some aspects, deriving hints from the metadata is performed by selecting a portion of a metadata field, such as the first two bytes of the field, and storing those bytes in a hint table, as described above. At block 1506, the apparatus controls NVM memory access operations based on the hints. In some aspects, controlling NVM memory access operations based on the hints is performed by storing cold data with other cold data, and storing sequential data with other sequential data, as described above. At block 1508, the apparatus determines a degree of correlation between host device behavior and the hint. In some aspects, determining a degree of correlation between host device behavior and the hint is performed by determining a ratio of the number of times a particular hint appears in the metadata to the number of times the host device performs a particular NVM array storage operation, as described above. At block 1510, the apparatus adjusts the control of the NVM access operations based on the degree of correlation. In some aspects, adjusting the control of the NVM access operations based on the degree of correlation is performed by suspending such control if the degree of correlation falls below a predetermined deactivation threshold value, as described above. In some aspects, a process in accordance with the teachings herein may include any combination of the above-described operations.

Second Example Process or Procedure

Figure 16:
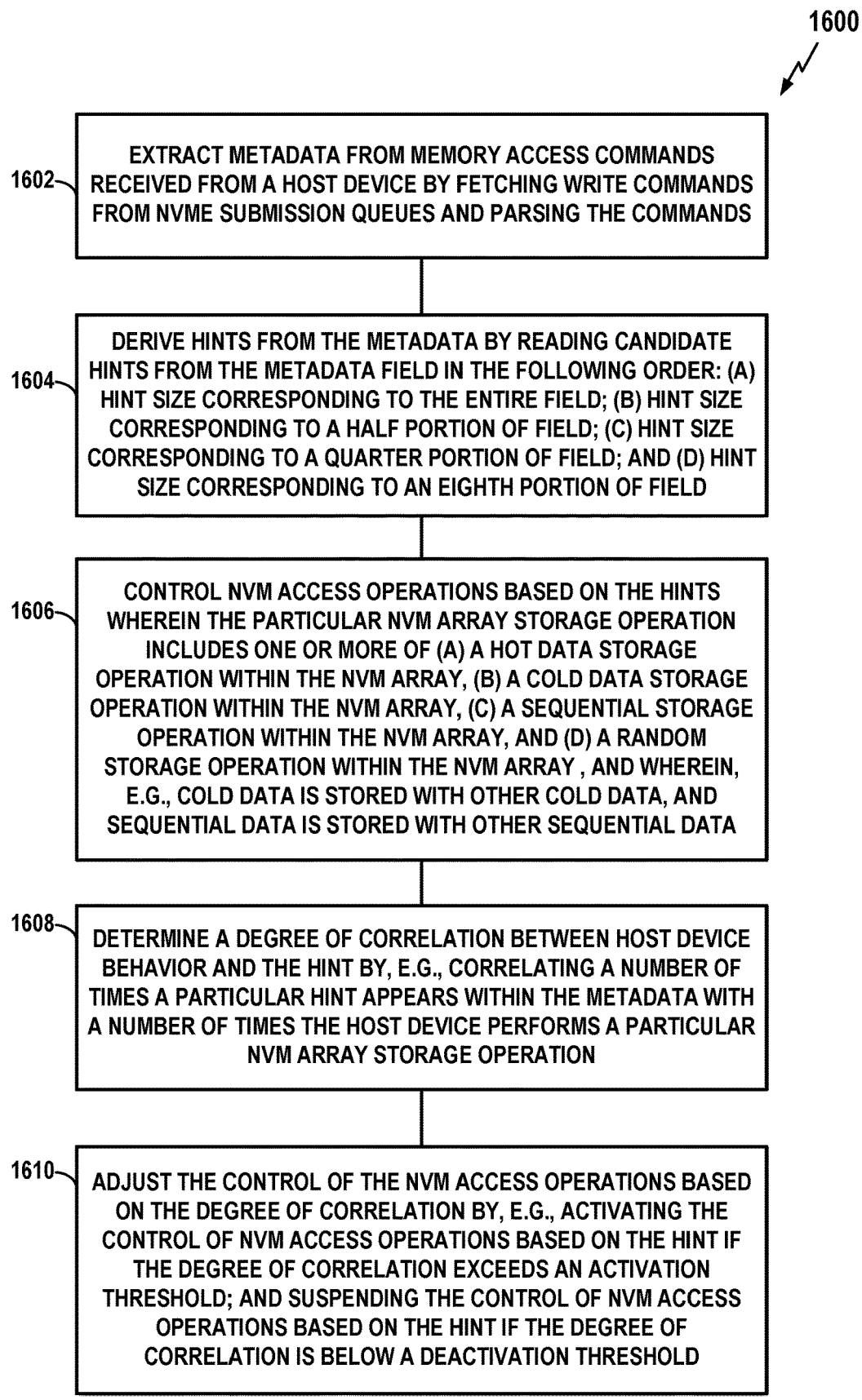
FIG. 16 illustrates a second example of a process for use by an SSD controller for adjusting the control of the NVM access operations based on a degree of correlation between hints and host behavior.

FIG. 16 illustrates another process 1600 in accordance with some aspects of the disclosure. The process 1600 may take place within an apparatus such as a processor or processing circuit (e.g., the processor(s) 1424 of FIG. 14), which may be located in an SSD controller or other suitable apparatus. At block 1602, an apparatus (e.g., a controller of an SSD) extracts metadata from memory access commands received from a host device by fetching write commands from NVMe submission queues and parsing the commands. At block 1604, the apparatus derives hints from the metadata by reading candidate hints from the metadata field in the following order: (a) hint size corresponding to the entire field; (b) hint size corresponding to a half portion of field; (c) hint size corresponding to a quarter portion of field; and (d) hint size corresponding to an eighth portion of field. In one particular example, where the metadata field is eight bytes long, the candidate hints are read from the following locations within the metadata field (in the following order): (a) hint size is eight bytes; (b) hint size is four bytes (two options); (c) hint size is two bytes (four options); and (d) hint size is one byte (eight options).

At block 1606, the apparatus controls NVM memory access operations based on the hints, wherein the particular NVM array storage operation includes one or more of (a) a hot data storage operation within the NVM array, (b) a cold data storage operation within the NVM array, (c) a sequential storage operation within the NVM array, and (d) a random storage operation within the NVM array, and wherein, for example, cold data is stored with other cold data, and sequential data is stored with other sequential data. At block 1608, the apparatus determines a degree of correlation between host device behavior and the hint by, e.g., correlating a number of times a particular hint appears within the metadata with a number of times the host device performs a particular NVM array storage operation. At block 1610, the apparatus adjusts the control of the NVM access operations based on the degree of correlation by, e.g., activating the control of NVM access operations based on the hint if the degree of correlation exceeds an activation threshold, and suspending the control of NVM access operations based on the hint if the degree of correlation is below a deactivation threshold. In some aspects, a process in accordance with the teachings herein may include any combination of the above operations.

Third Example Process or Procedure

Figure 17:
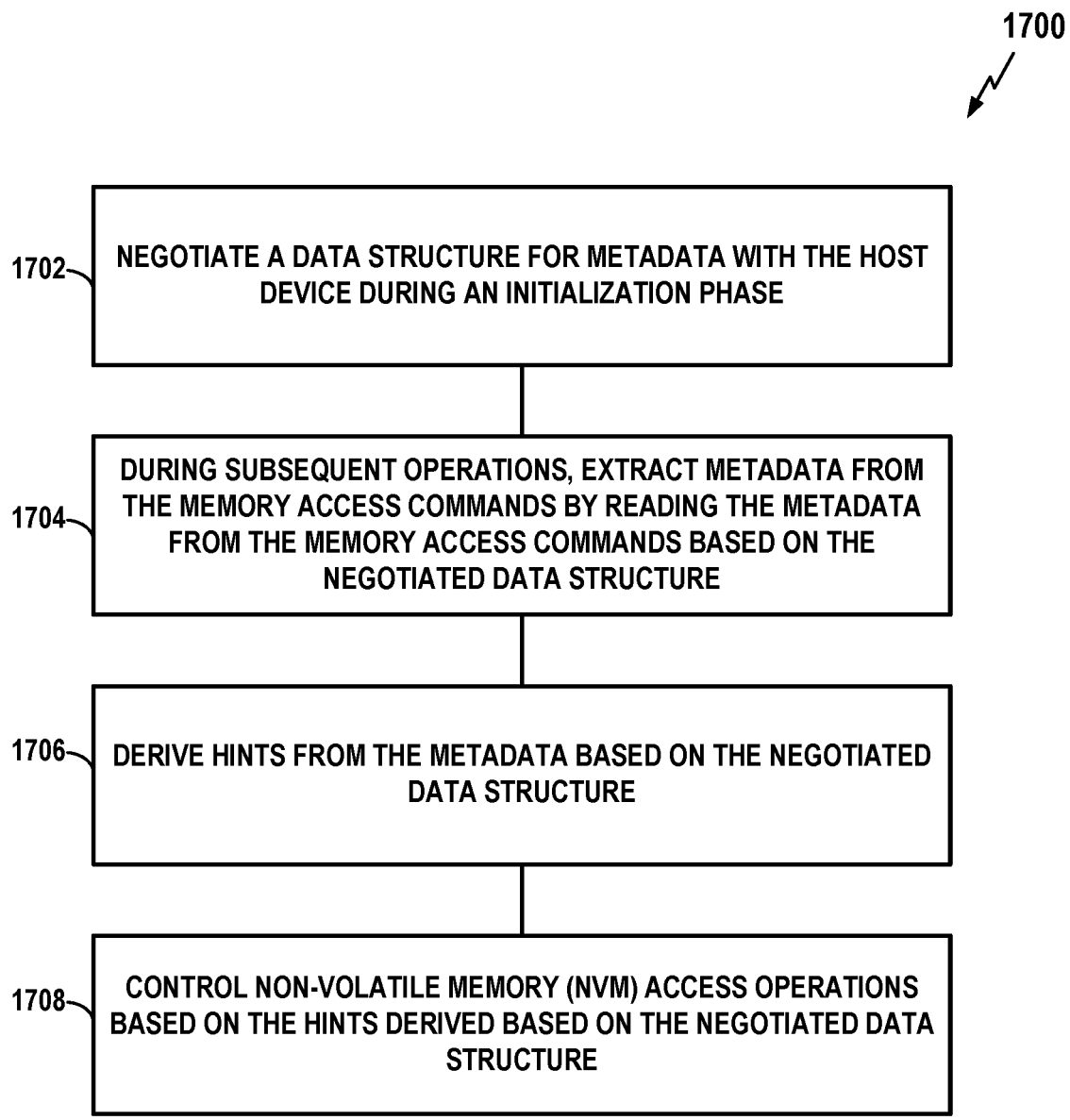
FIG. 17 illustrates an example of a process for use by an SSD controller for controlling NVM access operations based on a negotiated metadata structure.

FIG. 17 illustrates another process 1700 in accordance with other aspects of the disclosure. The process 1700 may take place within an apparatus such as a processor or processing circuit (e.g., the processor(s) 1424 of FIG. 14), which may be located in an SSD controller or other suitable apparatus. At block 1702, an apparatus (e.g., a controller of an SSD) negotiates a data structure for metadata with the host device during an initialization phase. In one aspect, negotiating the data structure for metadata with the host includes having the controller specify the particular structure for metadata hints that the controller wishes to receive and the host configures its components accordingly and issues an acknowledgement back to the controller, as discussed above. At block 1704, during subsequent operations, the apparatus extracts metadata from the memory access commands by reading the metadata from the memory access commands based on the negotiated data structure. At block 1706, the apparatus derives hints from the metadata based on the negotiated data structure. In some aspects, the host and the controller may agree to provide metadata per command rather than per LBA. In this embodiment, the apparatus derives the hints from the metadata based on the negotiated data structure by interpreting the hints stored in the metadata for the entire host command and not just for a specific LBA indicated in the command, as discussed above. At block 1708, the apparatus controls NVM access operations based on the hints derived based on the negotiated data structure. In some aspects, the apparatus controls the NVM access operations to store cold data with cold data and hot data with hot data, as discussed above. In some aspects, a process in accordance with the teachings herein may include any combination of the above operations.

First Example Apparatus

Figure 18:
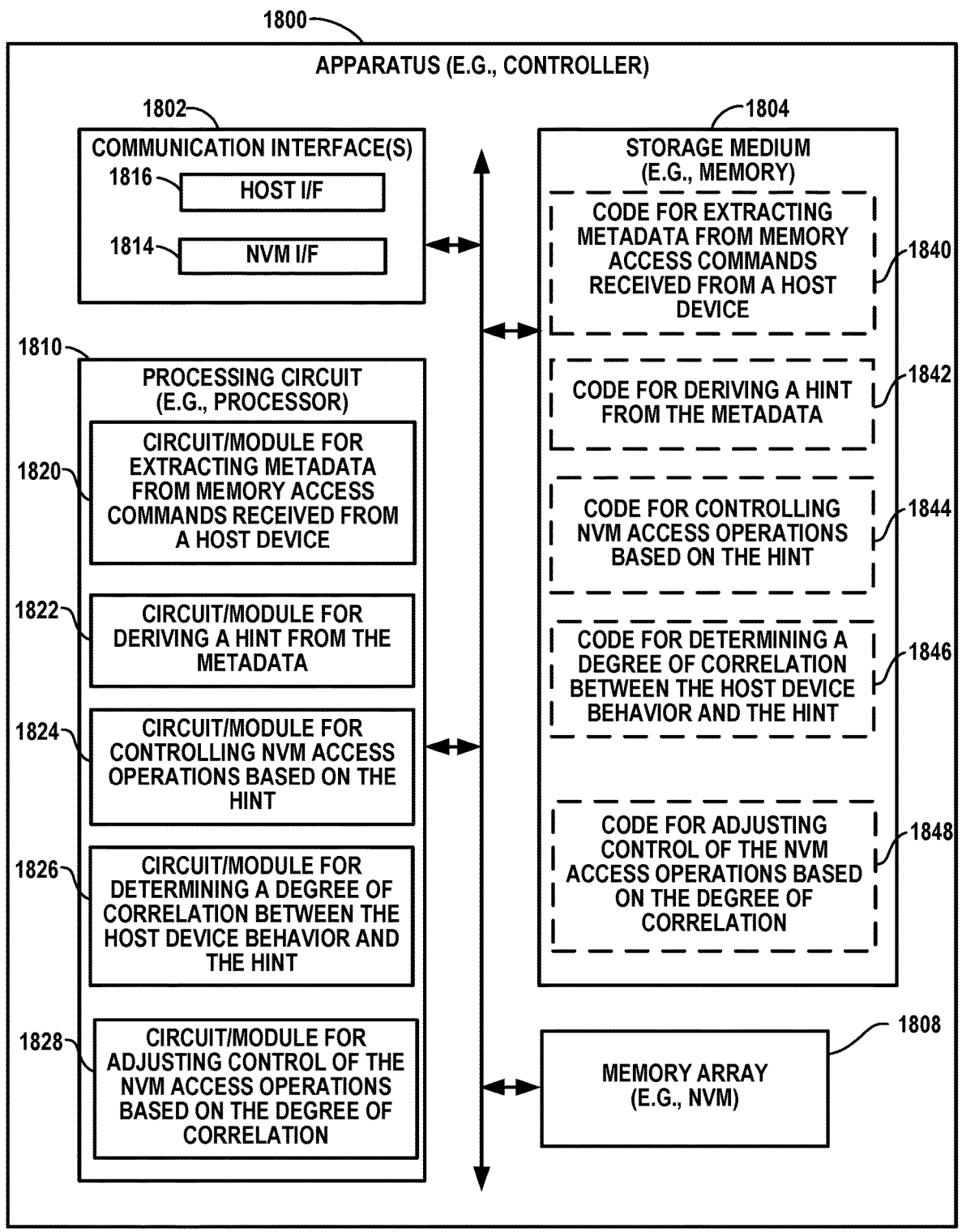
FIG. 18 illustrates a first example of a data storage apparatus (e.g., a controller), particularly highlighting exemplary components adjusting the control of the NVM access operations based on a degree of correlation between hints and host behavior.

FIG. 18 illustrates an embodiment of an apparatus 1800 configured according to one or more aspects of the disclosure. The apparatus 1800, or components thereof, could embody or be implemented within a controller, an SSD, a host device, an NVM device, a NAND die, or some other type of device that supports data storage. In various implementations, the apparatus 1800, or components thereof, could embody or be implemented within a computing device, a personal computer, a portable device, or workstation, a server, a personal digital assistant, a digital camera, a digital phone, an entertainment device, a medical device, or any other electronic device that stores data.

The apparatus 1800 includes a communication interface 1802, a storage medium 1804, a memory array (e.g., an NVM memory circuit) 1808, and a processing circuit 1810 (e.g., at least one processor and/or other suitable circuitry). These components can be coupled to and/or placed in electrical communication with one another via a signaling bus or other suitable component, represented generally by the connection lines in FIG. 18. The signaling bus may include any number of interconnecting buses and bridges depending on the specific application of the processing circuit 1810 and the overall design constraints. The signaling bus links together various circuits such that each of the communication interface 1802, the storage medium 1804, and the memory array 1808 are coupled to and/or in electrical communication with the processing circuit 1810. The signaling bus may also link various other circuits (not shown) such as timing sources, peripherals, voltage regulators, and power management circuits, which are well known in the art, and therefore, will not be described any further.

The communication interface 1802 provides a means for communicating with other apparatuses over a transmission medium. In some implementations, the communication interface 1802 includes circuitry and/or programming (e.g., a program) adapted to facilitate the communication of information bi-directionally with respect to one or more devices in a system. In some implementations, the communication interface 1802 may be configured for wire-based communication. For example, the communication interface 1802 could be a bus interface, a send/receive interface, or some other type of signal interface including drivers, buffers, or other circuitry for outputting and/or obtaining signals (e.g., outputting signal from and/or receiving signals into an integrated circuit). The communication interface 1802 serves as one example of a means for receiving and/or a means for transmitting.

The memory array 1808 may represent one or more memory devices. As indicated, the memory array 1808 may maintain hint correlation information 1818 along with other information used by the apparatus 1800. In some implementations, the memory array 1808 and the storage medium 1804 are implemented as a common memory component. The memory array 1808 may also be used for storing data that is manipulated by the processing circuit 1810 or some other component of the apparatus 1800.

The storage medium 1804 may represent one or more computer-readable, machine-readable, and/or processor-readable devices for storing programming, such as processor executable code or instructions (e.g., software, firmware), electronic data, databases, or other digital information. The storage medium 1804 may also be used for storing data that is manipulated by the processing circuit 1810 when executing programming. The storage medium 1804 may be any available media that can be accessed by a general purpose or special purpose processor, including portable or fixed storage devices, optical storage devices, and various other mediums capable of storing, containing or carrying programming.

By way of example and not limitation, the storage medium 1804 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a RAM, ROM, PROM, EPROM, an EEPROM, a register, a removable disk, and any other suitable medium for storing software and/or instructions that may be accessed and read by a computer. The storage medium 1804 may be embodied in an article of manufacture (e.g., a computer program product). By way of example, a computer program product may include a computer-readable medium in packaging materials. In view of the above, in some implementations, the storage medium 1804 may be a non-transitory (e.g., tangible) storage medium. For example, the storage medium 1804 may be a non-transitory computer-readable medium storing computer-executable code, including code to perform operations as described herein.

The storage medium 1804 may be coupled to the processing circuit 1810 such that the processing circuit 1810 can read information from, and write information to, the storage medium 1804. That is, the storage medium 1804 can be coupled to the processing circuit 1810 so that the storage medium 1804 is at least accessible by the processing circuit 1810, including examples where at least one storage medium is integral to the processing circuit 1810 and/or examples where at least one storage medium is separate from the processing circuit 1810 (e.g., resident in the apparatus 1800, external to the apparatus 1800, distributed across multiple entities, etc.).

Programming stored by the storage medium 1804, when executed by the processing circuit 1810, causes the processing circuit 1810 to perform one or more of the various functions and/or process operations described herein. For example, the storage medium 1804 may include operations configured for regulating operations at one or more hardware blocks of the processing circuit 1810, as well as to utilize the communication interface 1802 for wireless communication utilizing their respective communication protocols.

The processing circuit 1810 is generally adapted for processing, including the execution of such programming stored on the storage medium 1804. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1810 is arranged to obtain, process and/or send data, control data access and storage, issue commands, and control other desired operations. The processing circuit 1810 may include circuitry configured to implement desired programming provided by appropriate media in at least one example. For example, the processing circuit 1810 may be implemented as one or more processors, one or more controllers, and/or other structure configured to execute executable programming Examples of the processing circuit 1810 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1810 may also be implemented as a combination of computing components, such as a combination of a controller and a microprocessor, a number of microprocessors, one or more microprocessors in conjunction with an ASIC and a microprocessor, or any other number of varying configurations. These examples of the processing circuit 1810 are for illustration and other suitable configurations within the scope of the disclosure are also contemplated.

According to one or more aspects of the disclosure, the processing circuit 1810 may be adapted to perform any or all of the features, processes, functions, operations and/or routines for any or all of the apparatuses described herein. For example, the processing circuit 1810 may be configured to perform any of the steps, functions, and/or processes described with respect to FIGS. 1-17. As used herein, the term "adapted" in relation to the processing circuit 1810 may refer to the processing circuit 1810 being one or more of configured, employed, implemented, and/or programmed to perform a particular process, function, operation and/or routine according to various features described herein. The processing circuit 1810 may be a specialized processor, such as an ASIC that serves as a means for (e.g., structure for) carrying out any one of the operations described in conjunction with FIGS. 1-17. The processing circuit 1810 serves as one example of a means for sending and/or a means for receiving. In various implementations, the processing circuit 1810 may provide and/or incorporate, at least in part, the functionality described above for the controller 108 of FIG. 1 or the controller 1418 of FIG. 14.

According to at least one example of the apparatus 1800, the processing circuit 1810 may include one or more of: a circuit/module 1820 for extracting metadata from memory access commands received from a host device; a circuit/module 1822 for deriving a hint from the metadata; a circuit/module 1824 for controlling NVM access operations based on the hint; a circuit/module 1826 for determining a degree of correlation between the host device behavior and the hint; and a circuit/module 1828 for adjusting control of the NVM access operations based on the degree of correlation.

As mentioned above, a program stored by the storage medium 1804, when executed by the processing circuit 1810, causes the processing circuit 1810 to perform one or more of the various functions and/or process operations described herein. For example, the program may cause the processing circuit 1810 to perform the various functions, steps, and/or processes described herein with respect to FIGS. 1-17 in various implementations. As shown in FIG. 18, the storage medium 1804 may include one or more of: code for extracting metadata from memory access commands received from a host device 1840; code for deriving a hint from the metadata 1842; code for controlling NVM access operations based on the hint 1844; code for determining a degree of correlation between the host device behavior and the hint 1846; code for adjusting control of the NVM access operations based on the degree of correlation. In various implementations, the code shown in the storage medium 1804 may be executed or otherwise used to provide the functionality described herein for the circuit/modules of the processing circuit 1810.

In at least some examples, means may be provided for performing the functions illustrated in FIG. 18 and/or other functions illustrated or described herein. For example, the means may include one or more of: means, such as circuit/module 1820, for extracting metadata from memory access commands received from a host device; means, such as circuit/module 1822, for deriving a hint from the metadata; means, such as circuit/module 1824, for controlling NVM access operations based on the hint 1824; means, such as a circuit/module 1826, for determining a degree of correlation between the host device behavior and the hint; and means, such as circuit/module 1828, for adjusting control of the NVM access operations based on the degree of correlation.

Second Example Apparatus

Figure 19:
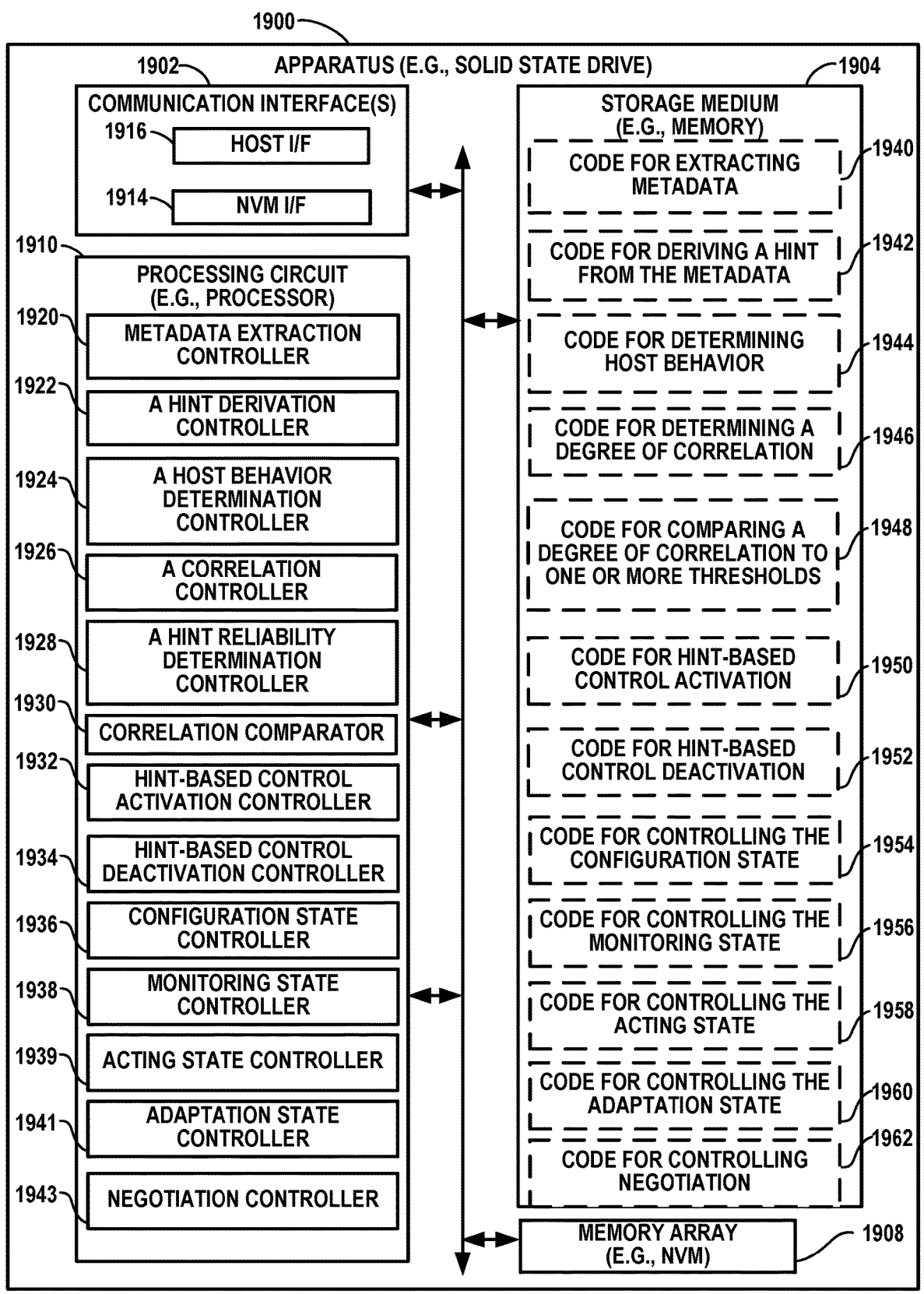
FIG. 19 illustrates a second example of a data storage apparatus, also highlighting exemplary components for adjusting the control of the NVM access operations based on a degree of correlation between hints and host behavior.

FIG. 19 illustrates an embodiment of an apparatus 1900 configured according to one or more aspects of the disclosure. The apparatus 1900, or components thereof, could embody or be implemented within an SSD or some other type of device that stores data. The apparatus 1900 includes a communication interface 1902, a storage medium 1904, a user interface 1906, a memory array 1908 (e.g., storing write level information 1918), and a processing circuit 1910 (e.g., at least one processor and/or other suitable circuitry). The communication interface 1902 may be coupled to one or more antennas 1912, and may include a transmitter 1914 and a receiver 1916. In general, the components of FIG. 19 may be similar to corresponding components of the apparatus 1800 of FIG. 18. The processing circuit 1910 may be adapted to perform any or all of the features, processes, functions, operations and/or routines for any or all of the apparatuses described herein. The processing circuit 1910 may be a specialized processor, such as an ASIC that serves as a means for (e.g., structure for) carrying out any one of the operations described in conjunction with FIGS. 1-17. The processing circuit 1910 serves as one example of a means for sending and/or a means for receiving. In various implementations, the processing circuit 1910 may provide and/or incorporate, at least in part, the functionality described above for the controller 108 or the SSD 104 of FIG. 1 or the controller 1418 of FIG. 14 and the state machine 600 of FIG. 6.

According to at least one example of the apparatus 1900, the processing circuit 1910 may include one or more of: a metadata extraction controller 1920 configured to extract metadata from commands received from the host device; a hint derivation controller 1922 configured to derive hint values from the metadata; a host behavior determination controller 1924 configured to determine host device behavior for the commands; a correlation controller 1926 configured to correlate the host device behavior with the hints derived from the metadata; a hint reliability determination controller 1928 configured to determine whether the host device behavior remains consistent with the hints derived from the metadata; a correlation comparator 1930 configured to compare a degree of correlation to one or more thresholds; a hint-based control activation controller 1932 configured to activate control of NVM access operations based on the hint if the degree of correlation exceeds an activation threshold as determined by the correlation comparator; a hint-based control deactivation controller 1934 configured to suspend the control of NVM access operations based on the hint if the degree of correlation is below a deactivation threshold as determined by the correlation comparator; a configuration state controller 1936 configured or equipped to configure a table that correlates hints with host behavior; a monitoring state controller 1938 configured to collect information and determining whether a threshold degree of correlation is maintained; an acting state controller 1939 configured to control NVM storage operations based on the hints while the threshold degree of correlation is maintained; an adaptation state controller 1941 in which the component adjusts the table to increase the degree of correlation; and a negotiation controller 1943 configured to negotiate a data structure for the metadata with the host device. It should be understood that, in examples that include a negotiation controller 1943, other components such as the correlation controller 1926 need not be used (as long as the negotiation with the host device is successful).

As noted, programming stored by the storage medium 1904, when executed by the processing circuit 1910, causes the processing circuit 1910 to perform one or more of the various functions and/or process operations described herein. For example, the programming may cause the processing circuit 1910 to perform the various functions, steps, and/or processes described herein with respect to FIGS. 1-17 in various implementations. As shown in FIG. 19, the storage medium 1904 may include one or more of code 1940 for extracting metadata from commands received from the host device; code 1942 for deriving hint values from the metadata; code 1944 for determining host behavior; code 1946 for correlating the host device behavior with the hints derived from the metadata to determine a degree of correlation; code 1948 for comparing the degree of correlation to one or more thresholds; code 1950 for activating control of NVM access operations based on the hint if the degree of correlation exceeds an activation threshold as determined by the correlation comparator; code 1952 for suspending the control of NVM access operations based on the hint if the degree of correlation is below a deactivation threshold as determined by the correlation comparator; code 1954 for controlling a configuration state to configure a table that correlates hints with host behavior; code 1956 for controlling a monitoring state to collect information and determining whether a threshold degree of correlation is maintained; code 1958 for controlling an acting state to control NVM storage operations based on the hints while the threshold degree of correlation is maintained; code 1960 for controlling an adaptation state in which the component adjusts the table to increase the degree of correlation; and code 1962 for negotiating a data structure for the metadata with the host device. It again should be understood that, in examples that include negotiation code 1962, other code components such as the correlation code 1946 need not be used (as long as the negotiation with the host device is successful).

In at least some examples, means may be provided for performing the functions illustrated in FIG. 19 and/or other functions illustrated or described herein. For example, the means may include one or more of: means, such as circuit/module 1920, for extracting metadata from memory access commands obtained from a host device; means, such as circuit/module 1922, for deriving a hint from the metadata of the commands; means, such as circuit/module 1924, for tracking host device behavior associated with the commands; means, such as circuit/module 1926, for correlating the host device behavior with the hints; means, such as circuit/module 1932, for controlling memory access operations to an NVM array based on the hints; means, such as circuit/module 1928, for determining whether the host device behavior remains consistent with the hints derived from the metadata; means, such as circuit/module 1934, for suspending control of the memory access operations based on the hints if the host device behavior no longer remains correlated with the hints; and means, such as circuit/module 1943, for negotiating a data structure for the metadata with the host device.

Still further, other means may be provided including: means, such as circuit/module 1930, for comparing the degree of correlation to one or more thresholds; means, such as circuit/module 1932, for activating control of NVM access operations based on the hint if the degree of correlation exceeds an activation threshold as determined by the correlation comparator; means, such as circuit/module 1934, for suspending the control of NVM access operations based on the hint if the degree of correlation is below a deactivation threshold as determined by the correlation comparator; means, such as circuit/module 1936, for controlling a configuration state to configure a table that correlates hints with host behavior; means, such as circuit/module 1938, for controlling a monitoring state to collect information and determining whether a threshold degree of correlation is maintained; means, such as circuit/module 1940, for controlling an acting state to control NVM storage operations based on the hints while the threshold degree of correlation is maintained; and means, such as circuit/module 1942, for controlling an adaptation state in which the component adjusts the table to increase the degree of correlation.

Fourth Example Process or Procedure

Figure 20:
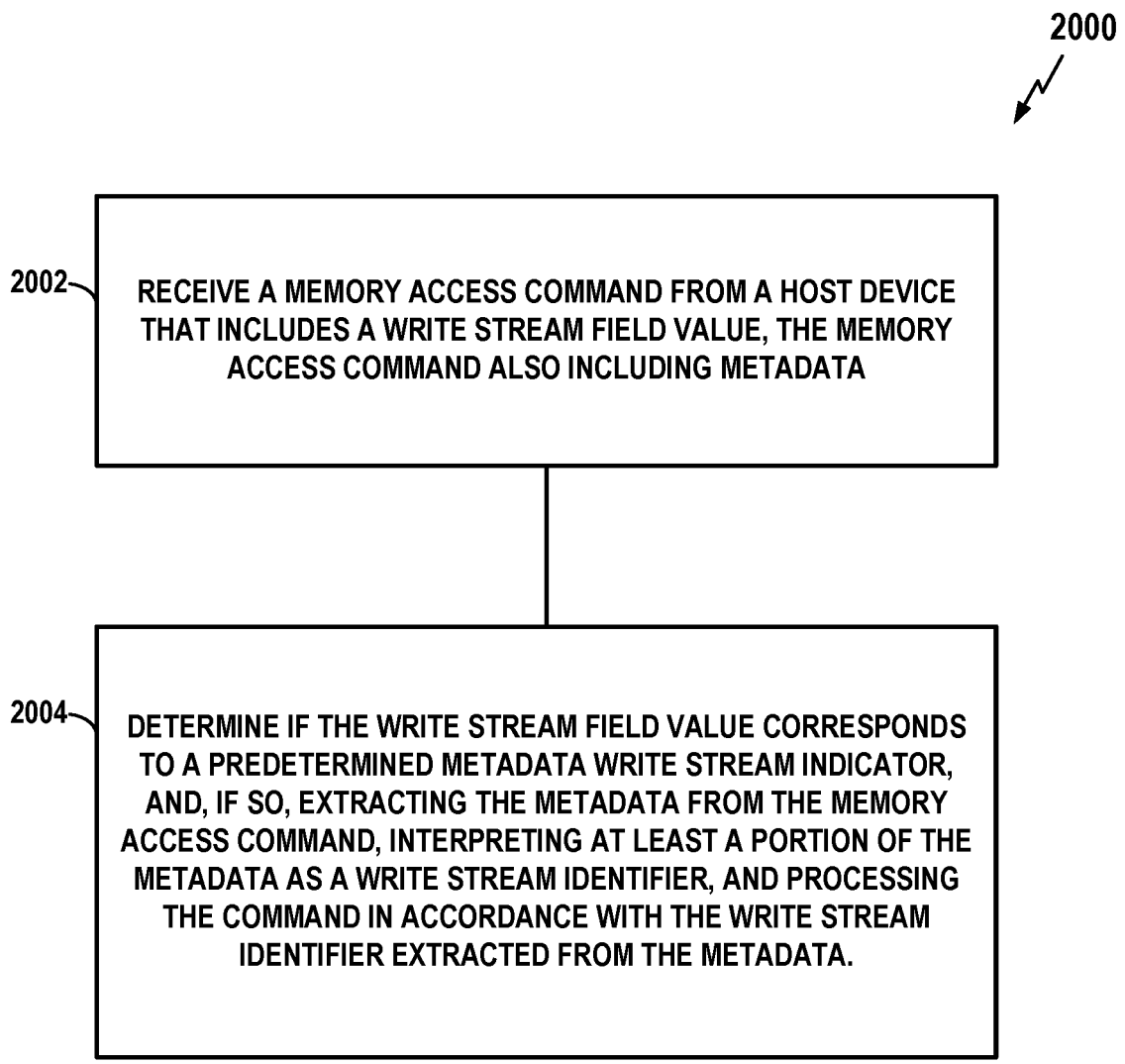
FIG. 20 illustrates an example of a process for use by an SSD controller for controlling the creation and use of virtual/expanded write streams.

FIG. 20 illustrates another process 2000 in accordance with other aspects of the disclosure. The process 2000 may take place within an apparatus such as a processor or processing circuit (e.g., the processor(s) 1424 of FIG. 14), which may be located in an SSD controller or other suitable apparatus. At block 2002, an apparatus (e.g., a controller of an SSD) receives a memory access command from a host device that includes a write stream field value, the memory access command also including metadata. In one aspect, the write stream field value is the NVMe write stream field value discussed above. At block 2004, the apparatus determines if the write stream field value corresponds to a predetermined metadata write stream indicator, and, if so, extracting the metadata from the memory access command, interpreting at least a portion of the metadata as a write stream identifier, and processing the command in accordance with the write stream identifier extracted from the metadata. In some aspects, these operations are implemented as shown in FIG. 11. In some aspects, a process in accordance with the teachings herein may include any combination of the above operations.

Third Example Apparatus

Figure 21:
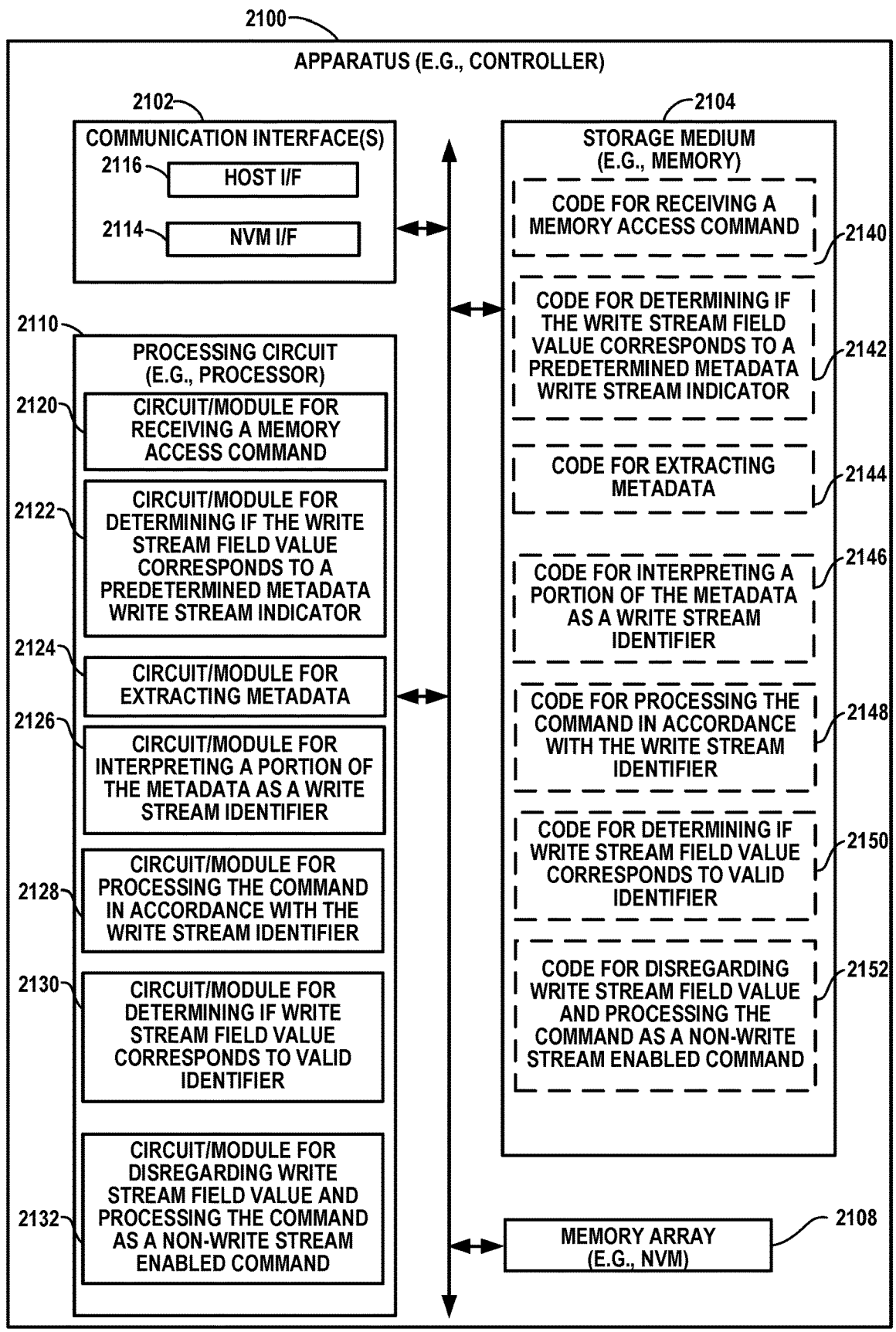
FIG. 21 illustrates a third example of a data storage apparatus, particularly highlighting exemplary components for controlling the creation and use of virtual/expanded write streams.

FIG. 21 illustrates an embodiment of an apparatus 2100 configured according to one or more aspects of the disclosure. The apparatus 2100, or components thereof, could embody or be implemented within an SSD or other type of device that stores data. The apparatus 2100 includes a communication interface 2102, a storage medium 2104, a user interface 2106, a memory array 2108 (e.g., storing write level information 2118), and a processing circuit 2110 (e.g., at least one processor and/or other suitable circuitry). The communication interface 2102 may be coupled to one or more antennas 2112, and may include a transmitter 2114 and a receiver 2116. In general, the components of FIG. 21 may be similar to corresponding components of the apparatus 1800 of FIG. 18.

According to one or more aspects of the disclosure, the processing circuit 2110 may be adapted to perform any or all of the features, processes, functions, operations and/or routines for any or all of the apparatuses described herein. For example, the processing circuit 2110 may be configured to perform any of the steps, functions, and/or processes described with respect to FIGS. 11-13. The processing circuit 2110 may be a specialized processor, such as an ASIC that serves as a means for (e.g., structure for) carrying out any one of the operations described in conjunction with FIGS. 11-13. In various implementations, the processing circuit 2110 may provide and/or incorporate, at least in part, the functionality described above for the controller 108 or the SSD 104 of FIG. 1 or the controller 1418 of FIG. 14.

According to at least one example of the apparatus 2100, the processing circuit 2110 may include one or more of: a circuit/module 2120 for receiving a memory access command that includes a write stream field value, the memory access command also including metadata; a circuit/module 2122 for determining if the write stream field value corresponds to a predetermined metadata write stream indicator; a circuit/module 2124 for extracting metadata from the memory access command; a circuit/module 2126 for interpreting a portion of the metadata as a write stream identifier; a circuit/module 2128 for processing the command in accordance with the write stream identifier; a circuit/module 2130 for determining if write stream field value corresponds to valid identifier and, if so, for interpreting the write stream field value as the write stream identifier and processing the command in accordance with the write stream identifier of the command; and a circuit/module 2132 for disregarding write stream field value and processing the command as a non-write stream enabled command.

As noted, programming stored by the storage medium 2104, when executed by the processing circuit 2110, causes the processing circuit 2110 to perform one or more of the various functions and/or process operations described herein. For example, the programming may cause the processing circuit 2110 to perform the various functions, steps, and/or processes described herein with respect to FIGS. 11-13 in various implementations. As shown in FIG. 21, the storage medium 2104 may include one or more of: code 2140 for receiving a memory access command from a host device that includes a write stream field value, the memory access command also including metadata; code 2142 for determining if the write stream field value corresponds to a predetermined metadata write stream indicator; code 2144 for extracting the metadata from the memory access command; code 2146 for interpreting at least a portion of the metadata as a write stream identifier; code 2148 for processing the command in accordance with the write stream identifier extracted from the metadata; code 2150 for determining if the write stream field value corresponds to a valid write stream identifier and, if so, for interpreting the write stream field value as the write stream identifier and processing the command in accordance with the write stream identifier of the command; and code 2152 for disregarding the write stream field value of the command and for processing the command as a non-write stream enabled command.

In at least some examples, means may be provided for performing the functions illustrated in FIG. 21 and/or other functions illustrated or described herein. For example, the means may include one or more of: means, such as circuit/module 2120, for extracting metadata from memory access commands obtained from a host device; means, such as circuit/module 2120, for receiving a memory access command from a host device that includes a write stream field value, the memory access command also including metadata; and means, such as circuits/modules 2122, 2124, 2126, and 2128 for determining if the write stream field value corresponds to a predetermined metadata write stream indicator, and, if so, for extracting the metadata from the memory access command, interpreting at least a portion of the metadata as a write stream identifier, and for processing the command in accordance with the write stream identifier extracted from the metadata.

Still further, the means may include one or more of: means, such as circuit/module 2120, for receiving a memory access command from a host device that includes a write stream field value, the memory access command also including metadata; means, such as circuit/module 2122, for determining if the write stream field value corresponds to a predetermined metadata write stream indicator; means, such as circuit/module 2124, for extracting the metadata from the memory access command; means, such as circuit/module 2126, for interpreting at least a portion of the metadata as a write stream identifier; means, such as circuit/module 2128, for processing the command in accordance with the write stream identifier extracted from the metadata; means, such as circuit/module 2130, for determining if the write stream field value corresponds to a valid write stream identifier and, if so, for interpreting the write stream field value as the write stream identifier and processing the command in accordance with the write stream identifier of the command; and means, such as circuit/module 2132, for disregarding the write stream field value of the command and for processing the command as a non-write stream enabled command.

ADDITIONAL ASPECTS

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage apparatus, comprising:
a non-volatile memory (NVM) array; and
a processor coupled to the NVM array and configured to
    extract metadata from memory access commands received from a host device,
    derive a hint from the metadata,
    control NVM access operations based on the hint,
    determine a degree of correlation between the host device behavior and the hint based on a ratio value derived from occurrences of the hint within the memory access commands and occurrences of a predetermined indicator of host device behavior, and
    adjust control of the NVM access operations based on the degree of correlation.

2. The data storage apparatus of claim 1, wherein the processor is configured to determine the degree of correlation between host device behavior and the hint by:
    counting a number of occurrences of the predetermined indicator of host device behavior;
    counting a number of occurrences of the hint within the commands; and
    determining the ratio value from the number of occurrences of the hint within commands and the number of the occurrences of the predetermined indicator of host device behavior, the ratio value representing the degree of correlation.

3. The data storage apparatus of claim 2, wherein the predetermined indicator of host device behavior comprises one or more of (a) an indication of a hot data storage operation within the NVM array, (b) an indication of a cold data storage operation within the NVM array, (c) an indication of a sequential storage operation within the NVM array, and (d) an indication of a random storage operation within the NVM array.

4. The data storage apparatus of claim 2, wherein the hint comprises one or more of (a) an entire metadata field of a command, (b) a half portion of the metadata field, (c) a quarter portion of the metadata field, and (d) an eighth portion the metadata field.

5. The data storage apparatus of claim 1, wherein the processor is configured as a state machine comprising:
    a configuration state controller equipped to configure a table that correlates hints with host device behavior;

a monitoring state controller configured to collect information and determine whether a threshold degree of correlation is maintained;
an acting state controller configured to control NVM storage operations based on the hints while the threshold degree of correlation is maintained; and
an adaptation state controller configured to adjust the table to increase the degree of correlation.

6. The data storage apparatus of claim 1, wherein the NVM array comprises NAND storage elements.

7. A controller for use with a non-volatile memory (NVM) array, the controller comprising:
a metadata extraction controller configured to extract metadata from memory access commands received from a host device;
a hint derivation controller configured to derive a hint from the metadata;
a host behavior determination controller configured to determine host device behavior for the commands;
a correlation controller configured to correlate the host device behavior with the hint derived from the metadata by determining a degree of correlation between the host device behavior and the hint based on a ratio value derived from occurrences of the hint within the memory access commands and occurrences of a predetermined indicator of host device behavior; and
a hint reliability determination controller configured to determine whether the host device behavior remains consistent with the hint derived from the metadata.

8. The controller of claim 7, further comprising:
a correlation comparator configured to compare the degree of correlation to one or more thresholds;
an activation controller configured to activate control of NVM access operations based on the hint if the degree of correlation exceeds an activation threshold as determined by the correlation comparator; and
a hint-based control deactivation controller configured to suspend the control of NVM access operations based on the hint if the degree of correlation is below a deactivation threshold as determined by the correlation comparator.

9. The controller of claim 7, further comprising:
a configuration state controller equipped to configure a table that correlates the hint with host device behavior;
a monitoring state controller configured to collect information and determine whether a threshold degree of correlation is maintained;
an acting state controller configured to control NVM storage operations based on the hint while the threshold degree of correlation is maintained; and
an adaptation state controller configured to adjust the table to increase the degree of correlation.

10. The controller of claim 7, further comprising:
a negotiation controller configured to negotiate a data structure for the metadata with the host device; and
wherein the metadata extraction controller is configured to extract the metadata from the memory access commands by reading the metadata from the memory access commands based on the negotiated data structure.

11. A method for use by a controller coupled to a non-volatile memory (NVM) array, the method comprising:
extracting metadata from memory access commands received from a host device;
deriving a hint from the metadata;
controlling NVM access operations based on the hint;
determining a degree of correlation between host device behavior and the hint based on a ratio value derived from occurrences of the hint within the memory access commands and occurrences of a predetermined indicator of host device behavior; and
adjusting control of the NVM access operations based on the degree of correlation.

12. The method of claim 11, wherein adjusting the control of the NVM access operations based on the degree of correlation comprises:
activating the control of NVM access operations based on the hint if the degree of correlation exceeds an activation threshold; and
suspending the control of NVM access operations based on the hint if the degree of correlation is below a deactivation threshold.

13. The method of claim 11, wherein determining the degree of correlation comprises determining the ratio value from a number of times the hint appears within the metadata and a number of the occurrences of the predetermined indicator of host device behavior.

14. The method of claim 11, wherein the predetermined indicator of host device behavior comprises one or more of (a) a hot data storage operation within the NVM array, (b) a cold data storage operation within the NVM array, (c) a sequential storage operation within the NVM array, and (d) a random storage operation within the NVM array.

15. The method of claim 11, wherein determining the degree of correlation between host device behavior and the hint based on the ratio value comprises:
determining the ratio value from a number of times the hint appears within the metadata and the number of times the host device performs a particular NVM array storage operation as indicated by the predetermined indicator of host device behavior;
comparing the ratio value to a correlation threshold; and
indicating that the host device behavior remains correlated with the hints if the ratio value remains at or above the correlation threshold, and indicating that the host device behavior no longer remains correlated with the hints if the ratio value falls below the correlation threshold.

16. The method of claim 15, further comprising:
maintaining a table that relates (a) a particular hint to (b) a count of a number of times the particular hint has appeared in the commands received from the host device and (c) a number of times a particular type NVM array storage operation has been performed when a command having the particular hint has been executed.

17. The method of claim 16, wherein the table further relates (a) each of a plurality of particular hints to (b) a count of a number of times each particular hint has appeared in the commands obtained from the host device and (c) a number of times each of a plurality of particular types of NVM array storage operations has been performed when a command having a corresponding particular hint has been executed.

18. The method of claim 11, further comprising:
negotiating a data structure for the metadata with the host device; and
wherein extracting the metadata from the memory access commands includes reading the metadata from the memory access commands based on the negotiated data structure.

19. A data storage apparatus, comprising:
means for extracting metadata from commands obtained from a host device;

means for deriving hints from the metadata of the commands;
means for tracking host device behavior associated with the commands;
means for correlating the host device behavior with the hints based on a ratio value derived from occurrences of the hints within the commands and occurrences of predetermined indicators of host device behavior;
means for controlling memory access operations to a non-volatile memory (NVM) array based on the hints;
means for determining whether the host device behavior remains consistent with the hints derived from the metadata; and
means for suspending control of the memory access operations based on the hints if the host device behavior no longer remains correlated with the hints.

20. The data storage apparatus of claim 19, further comprising means for negotiating a data structure for the metadata with the host device.

\* \* \* \* \*